US010600039B2

(12) United States Patent
Brown et al.

(10) Patent No.: US 10,600,039 B2
(45) Date of Patent: Mar. 24, 2020

(54) SYSTEMS AND METHODS FOR MANAGING FINANCIAL PAYMENTS BETWEEN PARTIES

(71) Applicants: MasterCard International Incorporated, Purchase, NY (US); Bank of America Corporation, Charlotte, NC (US)

(72) Inventors: David C. Brown, Dardenne Prairie, MO (US); Adam K. Hosp, Lake St. Louis, MO (US); Victor Lopes, Brookfield, CT (US); Peter John Bertanzetti, Charlotte, NC (US); David M. Grigg, Rock Hill, SC (US)

(73) Assignees: MASTERCARD INTERNATIONAL INCORPORATED, Purchase, NY (US); Bank of America Corporation, Charlotte, NC (US)

( * ) Notice: Subject to any disclaimer, the term of this patent is extended or adjusted under 35 U.S.C. 154(b) by 667 days.

(21) Appl. No.: 14/717,875

(22) Filed: May 20, 2015

(65) Prior Publication Data
US 2016/0342962 A1 Nov. 24, 2016

(51) Int. Cl.
*G06Q 20/10* (2012.01)
*G06Q 20/38* (2012.01)
*G06Q 40/00* (2012.01)

(52) U.S. Cl.
CPC ......... *G06Q 20/10* (2013.01); *G06Q 20/3821* (2013.01)

(58) Field of Classification Search
None
See application file for complete search history.

(56) References Cited

U.S. PATENT DOCUMENTS 5,715,314 A * 2/1998 Payne .................. G06Q 10/087
705/26.35
5,963,915 A * 10/1999 Kirsch .................. G06Q 20/12
705/26.8

(Continued)

FOREIGN PATENT DOCUMENTS

| WO | 2000067218 A1 | 11/2000 |
| WO | 2004031908 A2 | 4/2004 |
| WO | 2012112822 A2 | 8/2012 |

OTHER PUBLICATIONS

International Search Report and Written Opinion, Applic. No. PCT/US2016/033108, dated Sep. 1, 2016, 15pp.

*Primary Examiner* — Christopher Bridges
(74) *Attorney, Agent, or Firm* — Armstrong Teasdale LLP

(57) ABSTRACT

A computer-implemented method for managing financial payments between parties using an electronic payment computing device is provided. The method includes receiving a payee debit account identifier from a payee computing device, the payee debit account identifier associated with a payee debit account; creating a payee user account using the payee debit account identifier, wherein the payee user account is linked to the payee debit account; receiving a first payment request from the payee computing device requesting payment from a payor; generating a unique link for accessing a payment page associated with the first payment request; transmitting a second payment request to a payor computing device, wherein the second payment request includes the unique link; receiving a payment response from the payor computing device authorizing payment from a payor debit account to the payee; and prompting a transfer of funds from the payor debit account to the payee debit account.

28 Claims, 17 Drawing Sheets

(56) References Cited

U.S. PATENT DOCUMENTS

| | | | |
|---|---|---|---|
| 6,957,334 B1 * | 10/2005 | Goldstein | G06F 21/33 |
| | | | 713/170 |
| 7,031,939 B1 * | 4/2006 | Gallagher | G06Q 20/0855 |
| | | | 235/379 |
| 7,120,608 B1 | 10/2006 | Gallagher et al. | |
| 7,194,437 B1 | 3/2007 | Britto et al. | |
| 7,356,507 B2 | 4/2008 | Bezos et al. | |
| 7,373,329 B2 | 5/2008 | Gallagher et al. | |
| 7,536,351 B2 * | 5/2009 | Leblang | G06Q 20/00 |
| | | | 705/40 |
| 7,587,342 B2 | 9/2009 | Neofytides et al. | |
| 7,792,720 B2 | 9/2010 | Gallagher et al. | |
| 7,873,573 B2 | 1/2011 | Realini | |
| 7,909,246 B2 | 3/2011 | Hogg et al. | |
| 8,126,792 B2 | 2/2012 | Gallagher et al. | |
| 8,249,965 B2 | 8/2012 | Tumminaro | |
| 8,364,566 B2 | 1/2013 | Olliphant | |
| 8,532,021 B2 | 9/2013 | Tumminaro | |
| 8,688,570 B2 | 4/2014 | Jones et al. | |
| 8,700,526 B1 | 4/2014 | Cozens et al. | |
| 8,750,901 B1 | 6/2014 | Gupta et al. | |
| 2002/0042773 A1 * | 4/2002 | Fugitte | G06Q 20/10 |
| | | | 705/39 |
| 2002/0120567 A1 * | 8/2002 | Caplan | G07F 17/0014 |
| | | | 705/40 |
| 2005/0108155 A1 | 5/2005 | Gallagher et al. | |
| 2006/0195398 A1 * | 8/2006 | Dheer | G06Q 20/102 |
| | | | 705/40 |
| 2007/0203836 A1 | 8/2007 | Dodin | |
| 2007/0244811 A1 * | 10/2007 | Tumminaro | G06Q 20/10 |
| | | | 705/39 |
| 2010/0078472 A1 | 4/2010 | Lin et al. | |
| 2010/0082466 A1 | 4/2010 | Carlson et al. | |
| 2010/0082467 A1 | 4/2010 | Carlson et al. | |
| 2011/0137789 A1 | 6/2011 | Kortina et al. | |
| 2011/0184868 A1 * | 7/2011 | Lacerte | G06Q 20/04 |
| | | | 705/45 |
| 2011/0282788 A1 * | 11/2011 | Allison, Jr. | G06Q 20/0457 |
| | | | 705/44 |
| 2011/0320347 A1 | 12/2011 | Tumminaro et al. | |
| 2013/0060679 A1 | 3/2013 | Oskolkov et al. | |
| 2014/0067672 A1 | 3/2014 | Dheer et al. | |
| 2014/0081854 A1 | 3/2014 | Sanchez et al. | |
| 2014/0101049 A1 * | 4/2014 | Fernandes | G06Q 20/02 |
| | | | 705/44 |
| 2014/0136405 A1 * | 5/2014 | DuCharme | G06Q 20/3223 |
| | | | 705/40 |
| 2014/0149152 A1 | 5/2014 | Nickolson | |
| 2014/0214656 A1 | 7/2014 | Williams et al. | |
| 2014/0289103 A1 * | 9/2014 | Koh | G06Q 20/10 |
| | | | 705/39 |
| 2015/0006389 A1 | 1/2015 | Dean et al. | |
| 2015/0127527 A1 | 5/2015 | Eide | |
| 2016/0125368 A1 * | 5/2016 | Grassadonia | G06Q 20/0855 |
| | | | 705/44 |
| 2017/0364895 A1 * | 12/2017 | Van Heerden | G06Q 20/10 |

\* cited by examiner

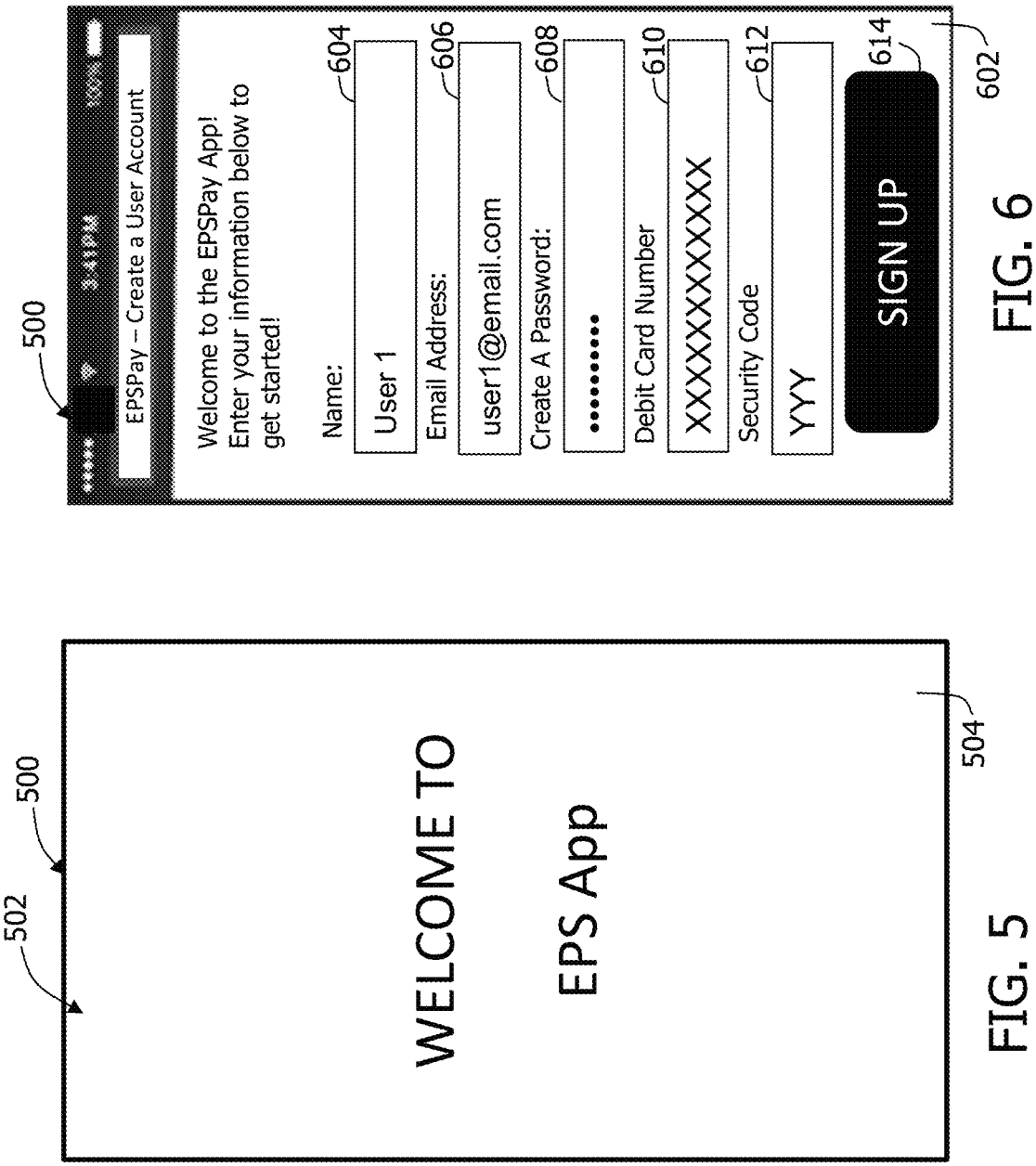

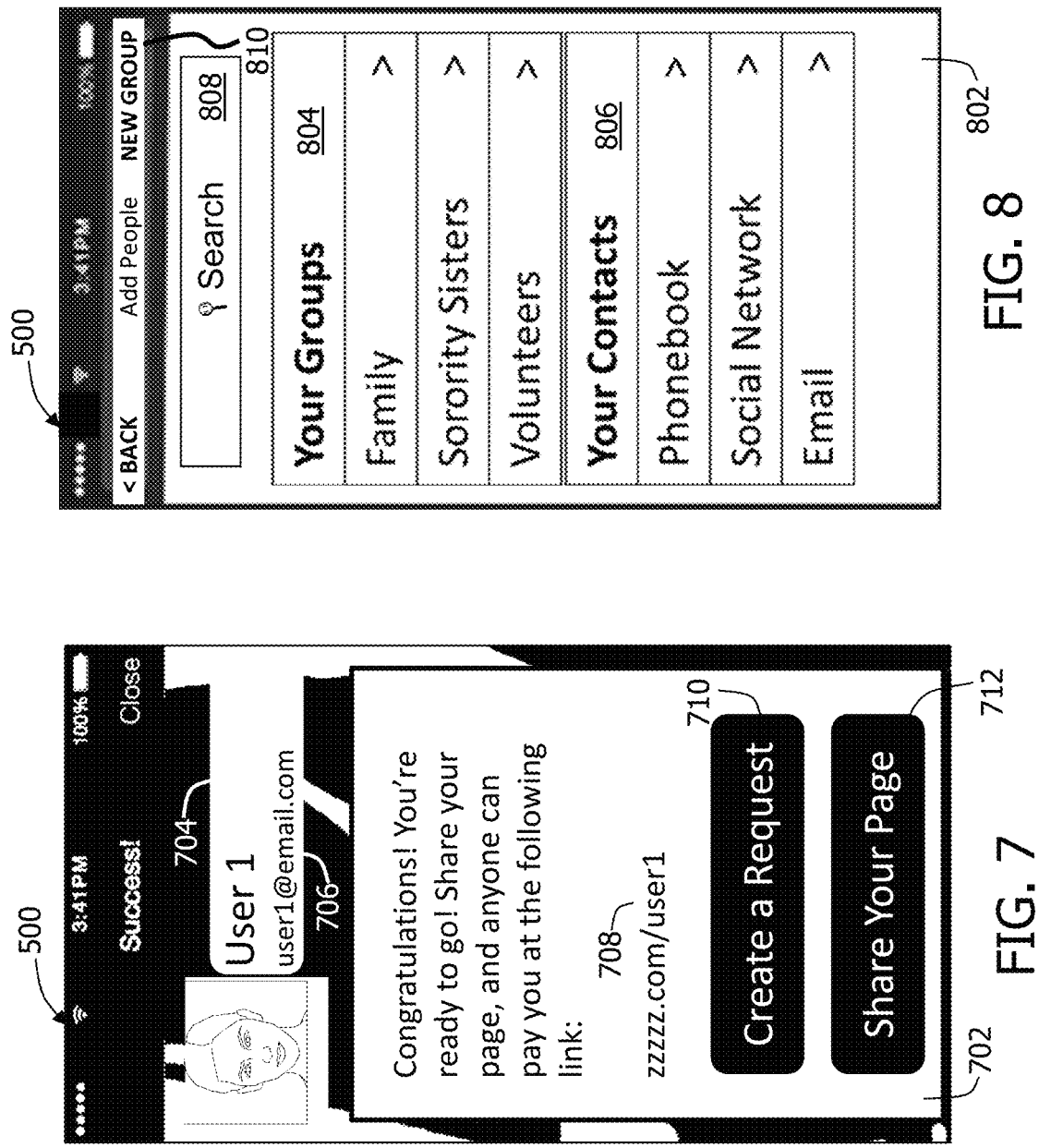

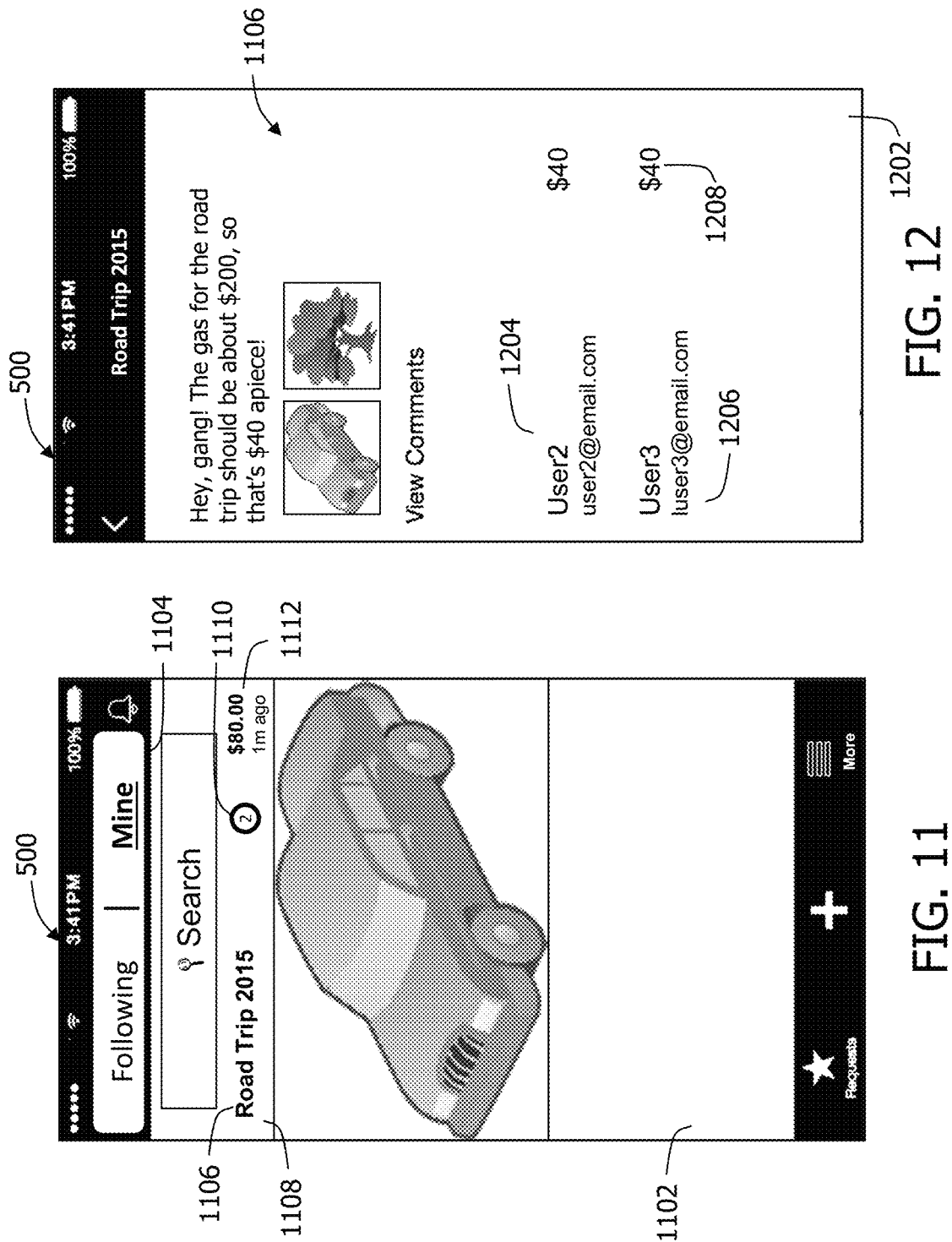

Requests / View All / Create
Fill in the form below to create a request

Request type —1604

| Contribution | Fixed |
|---|---|
| Each request can have a variable amount —1606 | Set an exact request amount |

Request Name —1608

`8th Grade Nature Trip`

Description —1610

`Assistance is needed to help our students plant trees at the Meadow Creek Restoration Project.`

Add Content?

[tree image] —1612

Request URL —1614a  —1614b  1614

`/user4/` `8th-grade-nature-trip`

Privacy Setting —1616  —1618

| Public | Private |
|---|---|
| Allow anyone to see this request | Only those who are sent the request can see it |

Invite Email Addresses —1620

[ ]

Invite Groups —1622

☑ 8th grade Parents (25 people)
☐ Fellow Teachers (30 people)

Ending Date —1624

[📅] `none`

CREATE REQUEST —1628

—1300

[ Delete ] [ Save as Draft ]
—1630  —1632

Request Preview

← → `zzzzzz.com/user4/8th-grade-nature-trip`

[tree image]

8th Grade Nature Trip
Assistance is needed to help our students plant trees at the Meadow Creek Restoration Project.

DONATE

[user image] User 4
East Middle School
CONTACT

Powered by EPSPay

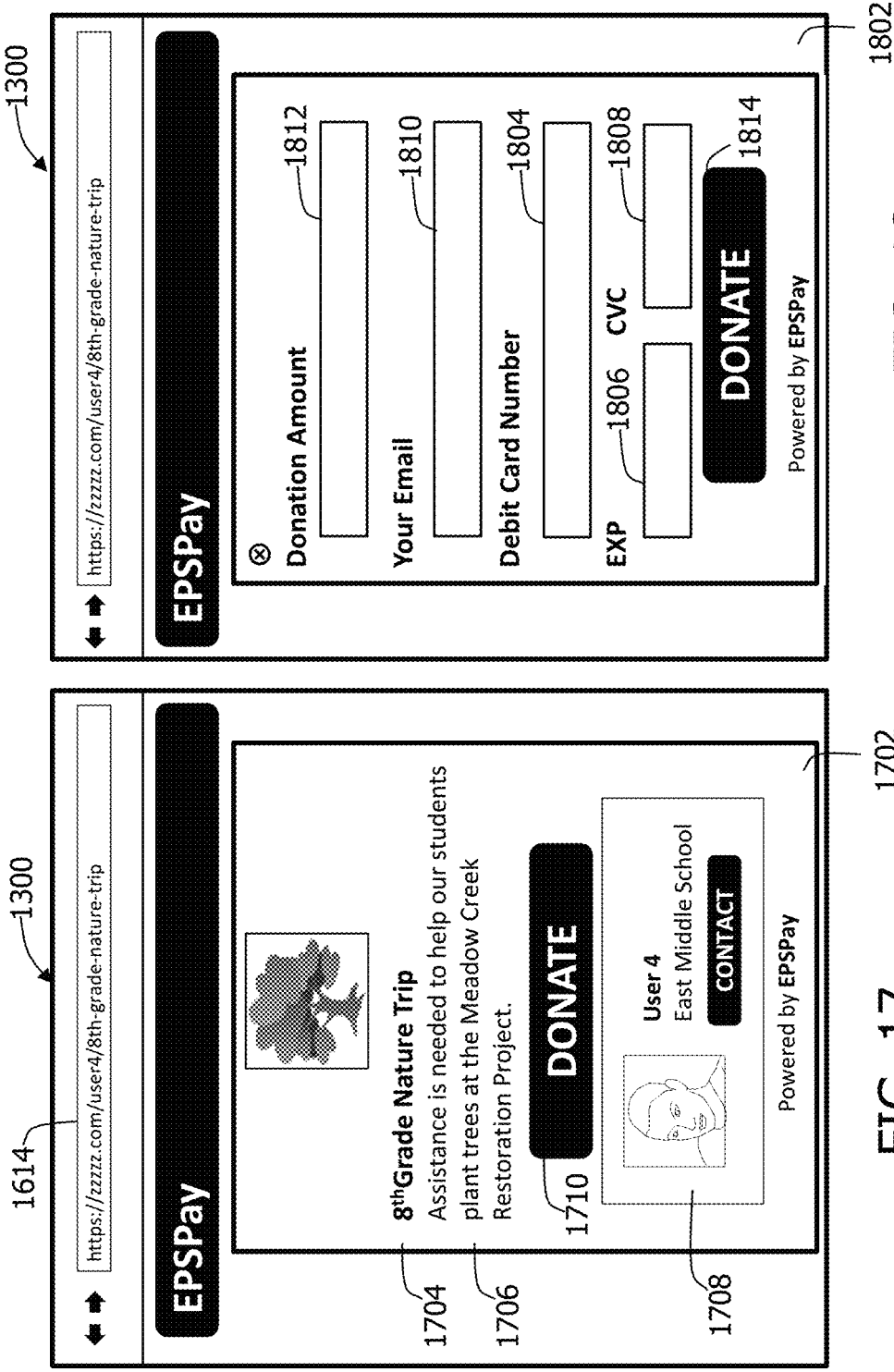

SYSTEMS AND METHODS FOR MANAGING FINANCIAL PAYMENTS BETWEEN PARTIES

BACKGROUND

The field of the disclosure relates generally to processing financial data, and more particularly, to a system and method that manages financial payments between parties.

Many known financial transactions occur with pre-existing processes and/or infrastructure. For example, payments between customers and merchants frequently include certain infrastructure such as point-of-sale terminals, electronic commerce stores, payment networks, banking systems, etc. These transactions may be referred to as "structured transactions." However, there are other types of financial transactions that occur without any pre-existing processes or infrastructure. These other types of transactions are "less structured" in nature. Although these less structured transactions may occur less frequently than the structured transactions on a per-consumer basis, the less structured transactions still occur rather frequently across all consumers. For example, less structured transactions may include (i) less frequent exchanges of goods and services where the merchant does not have a typical point-of-sale device in communication with a payment network, (ii) transactions involving community or social activities, (iii) certain charitable donations, and (iv) settlement of purchases made by one party on behalf of another.

In contrast to person-to-business or business-to-business transactions, these less structured transactions frequently lack infrastructure to facilitate payment from a first party to a second party. As a result, the parties to these types of transactions (i.e., the first and second party) often require the use of cash or checks to complete such transactions. Although many interactions may be facilitated by cash or check, many individuals engaged in these types of transactions may wish to avoid the complexities of cash or check transactions. Accordingly, methods for enabling financial payments between parties may be desirable.

BRIEF DESCRIPTION OF THE DISCLOSURE

In one aspect, a computer-implemented method for managing financial payments between parties using an electronic payment (EP) computing device is provided. The EP computing device is in communication with a memory. The method includes receiving, by the EP computing device, a payee debit account identifier from a payee computing device, the payee debit account identifier associated with a payee debit account. The method also includes creating, by the EP computing device, a payee user account using the payee debit account identifier, wherein the payee user account is linked to the payee debit account; and receiving a first payment request from the payee computing device requesting payment from a payor to the payee debit account. The method further includes generating a unique link for accessing a payment page associated with the first payment request, the unique link including at least a first portion associated with the payee user account and a second portion associated with a subject of the first payment request. The method still further includes transmitting, by the EP computing device, a second payment request, including the unique link, to a payor computing device; receiving a payment response from the payor computing device authorizing payment from a payor debit account to a payee associated with the payee user account; and prompting a transfer of funds from the payor debit account to the payee debit account.

In another aspect, an electronic payment (EP) computing device used to manage financial payments between parties is provided. The EP computing device includes a processor communicatively coupled to a memory device. The processor is programmed to receive a payee debit account identifier from a payee computing device, the payee debit account identifier associated with a payee debit account; and create a payee user account using the payee debit account identifier, wherein the payee user account is linked to the payee debit account. The processor is also programmed to receive a first payment request from the payee computing device requesting payment from a payor to the payee debit account. The processor is further programmed to generate a unique link for accessing a payment page associated with the first payment request, the unique link including at least a first portion associated with the payee user account and a second portion associated with a subject of the first payment request; and transmit a second payment request, including the unique link, to a payor computing device. The processor is still further programmed to receive a payment response from the payor computing device authorizing payment from a payor debit account to a payee associated with the payee user account; and prompt a transfer of funds from the payor debit account to the payee debit account.

In yet another aspect, at least one non-transitory computer-readable storage media having computer-executable instructions embodied thereon is provided. When executed by an electronic payment computing device having at least one processor coupled to at least one memory device, the computer-executable instructions cause the at least one processor to receive a payee debit account identifier from a payee computing device, the payee debit account identifier associated with a payee debit account. The computer-executable instructions also cause the at least one processor to create a payee user account using the payee debit account identifier, wherein the payee user account is linked to the payee debit account; receive a first payment request from the payee computing device requesting payment from a payor to the payee debit account; and generate a unique link for accessing a payment page associated with the first payment request, the unique link including at least a first portion associated with the payee user account and a second portion associated with a subject of the first payment request. The computer-executable instructions further cause the at least one processor to transmit a second payment request to a payor computing device, the second payment request including the unique link; receive a payment response from the payor computing device authorizing payment from a payor debit account to a payee associated with the payee user account; and prompt a transfer of funds from the payor debit account to the payee debit account.

BRIEF DESCRIPTION OF THE DRAWINGS

FIGS. 1-22 show example embodiments of the methods and systems described herein.

FIG. 1 is a schematic diagram illustrating an example multi-party financial processing system for facilitating and managing financial payments between parties.

FIG. 2 is a schematic diagram illustrating a flow of funds within the multi-party financial processing system shown in FIG. 1.

FIG. 3 is a first flow diagram of a process for managing financial payments between parties using the financial processing system shown in FIG. 1.

FIG. 4 is a second flow diagram of a process for managing financial payments between parties using the financial processing system shown in FIG. 1.

FIG. 5 depicts a welcome screen of an app for interacting with an electronic payment system (EPS) shown in FIG. 1.

FIG. 6 depicts an account creation screen of the app for interacting with the EPS shown in FIG. 1.

FIG. 7 depicts an example introduction screen indicating successful user account creation with the app for interacting with the EPS shown in FIG. 1.

FIG. 8 depicts an example contact screen of the app for interacting with the EPS shown in FIG. 1.

FIG. 9 depicts an example payment response screen of the app for interacting with the EPS shown in FIG. 1, in which a payor does not have a payor user account.

FIG. 10 depicts an example payment response screen of the app for interacting with the EPS shown in FIG. 1, in which a payor does have a payor user account.

FIG. 11 depicts an example sent requests screen of the app for interacting with the EPS shown in FIG. 1.

FIG. 12 depicts an example request screen of the app for interacting with the EPS shown in FIG. 1, for a particular sent request shown in FIG. 11.

FIG. 13 depicts an example dashboard of a website interface for interacting with the EPS shown in FIG. 1.

FIG. 14 depicts an alternate embodiment of a dashboard of the website interface for interacting with the EPS shown in FIG. 1.

FIG. 15 depicts an example sent requests screen of the website interface for interacting with the EPS shown in FIG. 1.

FIG. 16 depicts an example create request screen of the website interface for interacting with the EPS shown in FIG. 1.

FIG. 17 depicts an example payment page of the website interface for interacting with the EPS shown in FIG. 1.

FIG. 18 depicts a payment response screen of the website interface for interacting with the EPS shown in FIG. 1, in which the payor does not have a user account.

FIG. 19 is a simplified block diagram of the financial processing system shown in FIG. 1.

FIG. 20 illustrates an example configuration of a user device shown in FIG. 19 in accordance with one embodiment of the present disclosure.

FIG. 21 illustrates an example configuration of a server system shown in FIG. 19 in accordance with one embodiment of the present disclosure.

FIG. 22 is a diagram of components of a computer device that may be used in the system shown in FIG. 19.

Figure 1:
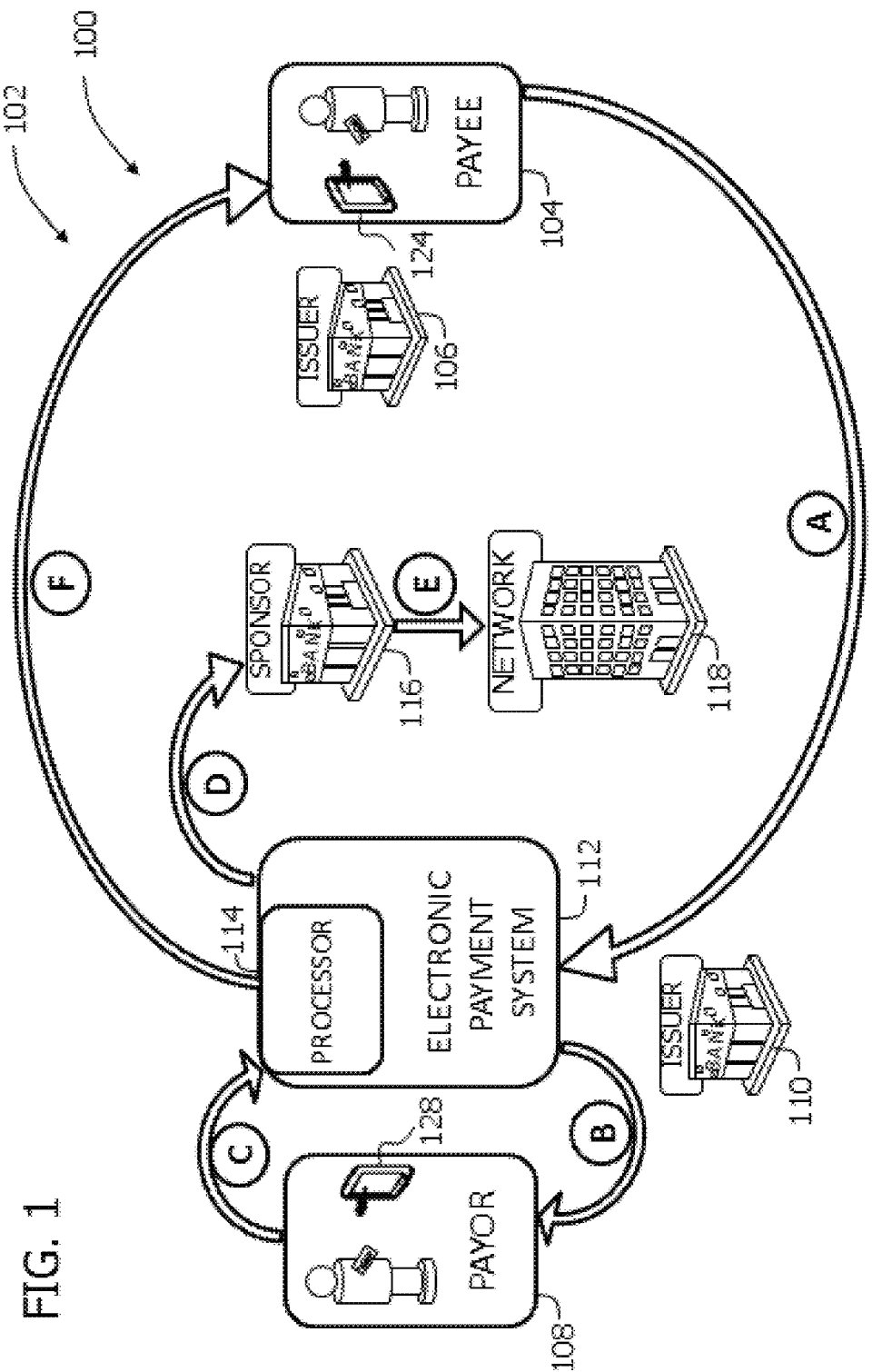

Like numbers in the figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The systems and methods described herein manage financial payments between parties by providing a platform for making payments from a first party to a second party. Specifically, an electronic payment system (EPS) is configured to: receive a payee debit account identifier from a payee computing device, the payee debit account identifier associated with a payee debit account; create a payee user account linked to the payee debit account; receive a first payment request from the payee computing device requesting payment from a payor to the payee debit account; generate a unique link for accessing a payment page associated with the first payment request; transmit a second payment request, including the unique link, to a payor computing device; receive a payment response from the payor computing device authorizing payment from a payor debit account to a payee associated with the payee user account; and prompt a transfer of funds from the payor debit account to the payee debit account.

The methods described are implemented using an electronic payment system (EPS) (also referred to herein as an electronic payment computing device). As described herein, the EPS includes a processor in communication with a memory. The EPS may be in communication, through any suitable method, with payor computing devices and/or payee computing devices (collectively, "user computing devices"). Such user computing devices may be any suitable computing device including, for example, desktop computing devices, laptop computing devices, and mobile computing devices.

As used herein, the term "payee" is used to identify a party requesting and/or receiving a payment, and the term "payor" is used to identify a party making a payment. A payee in one situation may be a payor in another situation. The identifiers, as such, are non-limiting but are merely used to aid in the understanding of the systems and methods described herein. As used herein, the term "user" refers generally to users of the EPS, who may be payees and/or payors.

As described herein, EPS is configured to efficiently create user payment accounts ("user accounts") based on user account information. In the example embodiment, such user account information may include debit account information. By receiving debit account information from a user computing device including, for example, debit card numbers, debit account numbers, and security codes, the EPS creates a user account that is linked to at least the user debit account identified by the user debit account information. In the example embodiment, the EPS is configured to use the user debit account number to identify the account holder of the user debit account. The EPS may then prompt a transfer funds between a payor debit account and a payee debit account. In some embodiments, the funds may be transferred using, for example, a payment processing network, an automated clearing house (ACH), and/or an internal transfer. In some embodiments, the funds may be transferred from the payor debit account to a holding account before being transferred to the payee debit account. In at least some examples, the EPS may retrieve other relevant information associated with the user debit account in creating the user account. Such relevant information may include, for example, account holder names, account holder balances, and account holder addresses. In some embodiments, user accounts can be created using account information for non-debit accounts including, without limitation, credit accounts, savings accounts, checking accounts, and any other suitable financial accounts.

As described herein, users may interact with the EPS using any suitable method including web interfaces and other online applications. In the example embodiment, users interact with the EPS via user computing devices. More specifically, such user computing devices may interact with the EPS using a downloaded application ("app") that allows users to create and manage accounts as well as request, transmit, and receive payments to and from other users.

In operation, the EPS is configured to receive a payment request from a payee computing device requesting payment from a payor debit account to the payee debit account. In the example embodiment, the payee computing device transmits a first payment request to the EPS via the app. For example, when User A creates a user account using the app, User A may interact with the EPS to request, transmit, or receive funds in the described transactions. In the example embodiment, User A transmits a first payment request to the EPS via the app in order to request funds from payor debit accounts associated with other users (i.e., payors).

When the payee computing device transmits the first payment request to the EPS, an identifier of each of the payors ("payor identifiers") may be provided with the first payment request. Such payor identifiers may include name identifiers, email addresses, phone numbers, payor user account identifiers, or any other suitable identifying information. In the example embodiment, payor identifiers do not include secure information such as payor debit account information. The first payment request may also include payee user account identifiers. The first payment request further includes a request identifier. The EPS is configured to associate the request identifier with the payee debit account, for example, using a look-up table. The request identifier is configured to eliminate the need to pass secure and/or sensitive information such as a debit account identifier between parties, and the request identifier may include, for example, a virtual token.

The EPS generates a unique link, wherein the unique link may be a URL (Uniform Resource Locator), and a second payment request based on the first payment request. The second payment request may include the request identifier, as well as payee user account identifiers. The EPS transmits the second payment request including the generated URL to user computing devices associated with other users (i.e., payor computing devices). In the example embodiment, the second payment request is presented on the app installed on a payor computing device. Alternately, the second payment request may be transmitted using any suitable mechanism including, for example, text message, email, social media, and instant message. In some embodiments, the second payment request may be transmitted using predetermined lists or groups of users (payors), for example, to a predetermined list of email addresses and/or to all payors whose contact information is included in a particular database. For example, a teacher may have a list of contact information of the parents of each child in the teacher's class, and the teacher may configure the first payment request such that the second payment request is sent to all of the parents using the contact information in the list.

As discussed above, the second payment request includes a unique URL, generated by the EPS, for making payments to the payee user account. The unique URL may be used persistently and allow payors to make payments to the payee user account from other systems without necessarily using the app. In further examples, the unique URL may also be provided independently of the second payment request using, for example, barcodes. In at least some embodiments, the generated unique URL includes a first portion associated with the payee user account and a second portion associated with the first payment request (e.g., the name of an event, a fundraising campaign, the destination of a school field trip, etc.). The unique URL allows a payor to access a payment page, which includes all of the details of the payment request and provides the opportunity for the payor to send a payment response. Moreover, the first portion of the URL may provide at least some verification or authentication that a payment request is coming from a particular party and/or is legitimate. For example, if a parent of a child receives a request asking for money for a field trip, the parent may see that the unique URL includes the name or user account identifier of the teacher of the child. The parent may feel more secure about sending a payment response because the parent knows that the request came from the teacher, based on the unique URL.

In some implementations, the EPS is configured to determine and/or verify whether each payor (to whom a payment request is sent) has a payor user account. If the EPS verifies that the payor does have a payor user account, the EPS may send the generated URL to the payor. If the EPS determines that the payor does not have a payor user account, the unique URL generated by the EPS may include a third portion with a payor identification token (e.g., a random set of numbers and/or letters) that is used to associate any payment response from the payor (without a payor user account) to the second payment request. The unique URL may, for example, be associated with a payment page that looks and behaves the same as the payment page accessed by any other payor, but will enable the payor identification token to be associated with the payment response sent from the payment page. Accordingly, payment responses received from payors without payor user accounts may be recorded and tracked by the EPS.

In some examples, the payee may wish to keep the transaction private and may accordingly make the first payment request using a "private" setting. In such examples, only the payors may view the second payment request. Alternatively, in other examples, the payee may wish to socialize or make "public" the transaction and may accordingly share the unique URL via social media. As used herein, the term "social media" refers generally to any form of public or semi-public communication, including group or multi-party emails, group or multi-party SMS messages, links on publicly accessible websites or apps, and social media/social networking websites and/or apps. When such transactions are socialized, in some examples other users may discover them by searching, for example, for donation or fundraising opportunities.

In other examples, the second payment request may be transmitted with explanatory information and/or images to identify the payee user account and the purpose of the payment request. Such explanatory information may include identifying colors, videos, streamed content, and/or other content.

In some examples, recipients of the second payment request may not have a payor user account when the second payment request is received. Accordingly, the second payment request may also include an option to create a (payor/payee) user account by prompting a user to input user account information including, for example, user (payor) debit account information. In some embodiments, a recipient of a second payment request may be able to respond to the second payment request (i.e., make a payment) without creating a (payor/payee) user account. The recipient of the second payment request may make a payment by entering at least his or her debit account information.

The EPS is configured to receive a payment response from the payor computing device authorizing payment from the payor debit account to the payee debit account. The payment response includes a payment amount, payor user account identifiers, the request identifier associated with the first payment request, and a response identifier. The EPS is configured to associate the response identifier with the payor debit account, for example, using a lookup table. The response identifier is configured to eliminate the need to pass secure and/or sensitive information such as a debit account identifier between parties and may be, for example, a virtual token. Upon receipt of the payment response, the EPS may prompt a transfer of funds from the payor debit account to the payee debit account. In some embodiments, the EPS is configured to transfer the funds from the payor debit account to the payee debit account. In other embodiments, the EPS is configured to prompt the transfer of funds by transmitting an authorization message to a sponsor bank, wherein the sponsor bank coordinates the transfer of funds using an interchange network (also referred to herein as a "payment processing network"). The sponsor bank receives the authorization message from the EPS, withdraws funds in the payment amount from the payor's debit account associated with the response identifier, transfers the funds to the payee's debit account associated with the request identifier. In at least some embodiments, the EPS may first authorize the transfer by verifying, for example, valid account access on the part of the payor and sufficient funds in the payor debit account.

In some embodiments, the EPS may allow users to effectively manage their payment requests. In one embodiment, a payee may transmit a plurality of payment requests to a plurality of payors (e.g., to organize a fundraiser with several associates) and wish to track the status of each of the payment requests. The EPS may be configured to enable such tracking and reporting of each payment request. Similarly, in many embodiments, such payment requests and corresponding payments may be associated with non-profit charities. The EPS may also be configured to transmit tax forms to payors upon successful transfer of funds from payor debit accounts to payee debit accounts. Similarly, the EPS may be configured to allow users to send reminders to payors who have not paid yet. For example, the EPS may enable the payee to configure reminders to the payor(s). Such reminders may be configured to occur at particular intervals (e.g., daily, weekly) prior to a payment cut-off date and/or on particular days prior to the payment cut-off date (e.g., 7, 5, 3, 2, and/or 1 day(s) before the payment cut-off date). In some embodiments, the payee may configure the first payment request to enable partial payments from a payor. In these embodiments, the EPS may enable the payee to configure reminders to the payor that only a partial payment has been received. Accordingly, the EPS may be configured to store a pre-selected period of time, selected by the payee, for sending a reminder message. The EPS may then track an amount of time that elapses after transmitting the second payment request to the payor. If the pre-selected period of time expires without receipt of a payment response from the payor, the EPS may automatically transmit the reminder message to the payor computing device.

In some implementations, multiple users may be permitted to link to the same (payee) debit account. In one example, a "primary party" (e.g., a charitable organization, a school, etc.) is identified by a particular (payee) debit account identifier. A user associated with the primary party may create a user account (a "primary user account") based on the debit account identifier and then associate other user accounts ("secondary user accounts") with the primary user account, and thus associate the secondary users accounts with the debit account for the primary party (the "primary debit account"). As a result, such secondary user accounts may be used to make requests on behalf of the primary party. In at least some implementations, the secondary user accounts may not have any access to the underlying primary debit account. Therefore, the EPS may enable multiple individuals to solicit funds for the primary party without any individual ability to access the funds of the primary party. For example, if the primary party is a school, a school administrator (e.g., principal, superintendent) may have the authority to identify secondary user accounts (e.g., user accounts of teachers at the school) that may be given permission to solicit funds on behalf of the school.

In some implementations, the primary party is able to control permissions of the secondary user accounts regarding access to the primary user account. For example, the permissions may include a maximum number of first payment requests that may be generated on behalf of the primary party and/or primary user account, a list of specific users to whom first payment requests may be sent, limits on the dollar amount requested on behalf of the primary party (a total limit and/or a limit on each first payment request), limits on to whom payment requests can be sent (which may include controls on whether "public" payment requests are permitted), and particular allowed channels over which payment requests may be sent (e.g., email only). In such implementations, the EPS may present an administrator interface to an administrator associated with the primary party. The administrator interface may include a prompt to enter user account information for any parties to which the administrator wishes to grant authority so solicit funds on the primary party's behalf (e.g., teachers at a school). The EPS may then create a proxy role in those user accounts (herein referred to as "secondary user accounts" when given permission to act on behalf of the primary party). The proxy role allows the user to use his or her secondary (personal) user account to solicit funds on behalf of the primary party without having access to the primary user account. The administrator interface may also include options to input various controls or permissions over one, some, or all of the secondary user accounts linked to the primary debit account. The EPS receives the input permissions and imposes those permissions on the proxy role of each secondary user account.

In such implementations, each of the secondary user accounts may also be associated with personal or individual user accounts. For example, User A may have a user account that is associated with User A's personal debit account and with the primary debit account associated with a primary party. When User A transmits a payment request to the EPS to request funds from other users, User A designates the proxy role under which to transmit the payment request. For example, User A may be a teacher at a school (primary party) and may have been granted authority to solicit funds from parents of students on behalf of the school, for example, for a field trip. User A may transmit a payment request to the parents of students using User A's proxy role as a teacher, wherein the proxy role of User A's user account is associated with a primary debit account of the school. The payment request may include an indicator validating User A's authority to make such a request on behalf of the school. The indicator may include primary user account identifier(s) and/or a validation token. Moreover, User A may use User A's user account under a personal or non-proxy role to solicit funds from, for example, friends, on behalf on his- or herself, wherein the non-proxy role of User A's user account is associated with User A's personal debit account.

In some implementations, when a user is sending a request associated with a proxy role on behalf of a primary party, the EPS may be configured to generate the unique link (e.g., a unique URL) including a fourth portion associated with the primary party. The fourth portion may serve to further validate and authenticate that a secondary user account is sending a payment request on behalf of the primary party. For example, the unique URL may directly identify the primary party in the fourth portion, which verifies that the payment request is associated with the primary party (and the primary debit account) as opposed to the secondary user account (and the debit account of the secondary user).

As described above, in some implementations, transactions may include transactions made between a first user (a requesting user) and a second user (a paying user or payor) wherein the first user is acting on behalf of a primary party. For example, the first user may be a teacher at a school working on a fundraiser for a particular program of the school. In such implementations, the system described herein allows the teacher to make requests on behalf of the school. Accordingly, the EPS is configured to provide secure transactions. Specifically, the EPS is configured to: (a) receive an authorization message from an administrator associated with a primary party, the authorization message authorizing a payee user account to transmit payment requests on behalf of the primary party; (b) receive at least one permission from the administrator, the at least one permission associated with the payee user account, wherein the at least one permission is configured to impose a control on the payee user account; (c) store the at least one permission in a memory; (d) impose the control of the at least one permission on the payee user account; (e) receive a primary debit account identifier from an administrator user computing device, the primary debit account identifier associated with a primary debit account; (f) create a primary user account using the primary debit account identifier, wherein the primary user account is linked to the primary debit account, and wherein the administrator has authority over the primary user account; (g) prompt the administrator to input a plurality of existing secondary user accounts, each of the plurality of secondary user accounts associated with a user associated with the primary party; (h) create a proxy role in each of the plurality of secondary user accounts that links each of the plurality of secondary user accounts with the primary debit account; (i) receive the first payment request associated with the proxy role in the payee user account, requesting payment from the payor to the primary debit account; (j) transmit a second payment request to the payor user computing device; (k) receive the payment response from the payor user computing device authorizing payment from the payor debit account to the primary party; and (l) prompt a transfer of funds from the payor debit account to the primary debit account.

As used herein, the terms "transaction card," "financial transaction card," "payment card," and "payment device" refer to any suitable transaction card, such as a credit card, a debit card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of payment device can be used as a method of payment for performing a transaction.

The methods and systems described herein may be implemented using computer programming or engineering techniques including computer software, firmware, hardware, or any combination or subset therefor. At least one of the technical problems addressed by this system includes: (i) inefficient methods for requesting payment from multiple parties; (ii) inefficient or ineffective methods for tracking multiple requests to multiple parties; and (iii) delayed or costly transfer of funds between parties.

The technical effect of the systems and method described herein is achieved by performing at least one of the following steps: (i) receiving a payee debit account identifier from a payee computing device, the payee debit account identifier associated with a payee debit account; (ii) creating a payee user account using the payee debit account identifier, wherein the payee user account is linked to the payee debit account; (iii) receiving a first payment request from the payee computing device requesting payment from a payor to the payee debit account; (iv) generating a unique link for accessing a payment page associated with the first payment request, wherein the unique link includes at least a first portion associated with the payee user account and a second portion associated with a subject of the first payment request; (v) transmitting the second payment request to a payor computing device, wherein the second payment request includes the unique link; (vi) receiving a payment response from the payor computing device authorizing payment from a payor debit account to a payee associated with the payee user account; and (vii) prompting a transfer of funds from the payor debit account to the payee debit account.

The resulting technical effect achieved is at least one of: (i) efficient method for requesting and tracking payment requests; and (ii) simplified and efficient transfer of funds between parties.

The following detailed description illustrates embodiments of the disclosure by way of example and not by way of limitation. It is contemplated that the embodiments have general application to processing financial transaction data and geodemographic data by a third party in industrial, commercial, and residential applications.

FIG. 1 is a schematic diagram 100 illustrating an example multi-party financial processing system 102 for facilitating financial payments between parties. More specifically, diagram 100 illustrates an example data flow between parties in processing system 102 during a payment request process. In the example embodiment, a payee 104 has an established debit account at a first issuing bank 106. A payor 108 has an established debit account at a second issuing bank 110. An issuing bank 106, 110 maintains the debit account of payee 104 and payor 108, respectively, and may issue a payment card or electronic payments account identifier, such as a credit card, to payee 104 or payor 108, respectively. Although first and second issuing banks 106, 110 are shown as two separate banks, in some embodiments, first and second issuing banks 106, 110 may be the same bank. Payee 104 and/or payor 108 may use their respective payment card(s) to access funds in the debit account and/or to initiate transactions, including tendering payment.

Payee 104 creates a payee user account with an electronic payment system (EPS) 112. In the example embodiment, payor 108 creates a payor user account with EPS 112. EPS 112 includes a processor 114 that allows payee 104 and/or payor 108 to access and interact with EPS 112 using a website or app on a user computing device. More specifically, payee 104 uses payee computing device 124 to interact with EPS 112, and payor 108 uses payor computing device 128 to interact with EPS 112. To initiate the payment process, payee 104 sends (A) a first payment request to EPS 112. In the example embodiment, the first payment request includes a payor identifier for each payor 108 from whom payee 104 is requesting payment. Such payor identifiers may include name identifiers, email addresses, phone numbers, payor user account identifiers, or any other suitable identifying information of each payor 108. The first payment request may also include payee user account identifiers as well as a request identifier. EPS 112 associates the request identifier with the payee debit account, for example, using a look-up table.

EPS 112 sends (B) a second payment request to a payor computing device associated with payor 108, wherein the second payment request is based on the first payment request. The second payment request includes a unique URL generated by EPS 112, for making payments to the payee user account. In at least some embodiments, the generated unique URL includes a first portion associated with the payee user account and a second portion associated with the first payment request (e.g., the name of an event, a fundraising campaign, the destination of a school field trip, etc.). In some embodiments, the second payment request may be transmitted with explanatory information and/or images to identify the payee user account and the purpose of the payment request. Such explanatory information may include identifying colors, videos, streamed content, and/or other content. The second payment request may further include the request identifier, as well as a payee user account identifier. In the example embodiment, the second payment request is presented on an interface of payor computing device 128.

Payor 104 sends (C) a payment response to EPS 112. In the example embodiment, the payment response includes a payment amount and an authorization to withdraw funds in the payment amount from the payor debit account. The payment response also includes a payor user account identifier, the request identifier associated with the first payment request, and a response identifier. EPS 112 associates the response identifier with the payor debit account, for example, using a lookup table.

In the example embodiment, EPS 112 prompts a transfer of funds by transmitting (D) the authorization included in the response message to a sponsor bank 118. EPS 112 may also transmit (D) a payee debit account identifier and a payor account identifier either directly (e.g., the debit account number, PAN, BIN) or in a tokenized format. Sponsor bank 116 coordinates (E) a withdrawal of funds from the payor debit account in the payment amount and a transfer of the funds to the payee debit account through a payment processing network 118. In some embodiments, sponsor bank 116 may facilitate real-time processing of funds. In other embodiments, the processing of funds may be complete within a short period of time (e.g., 15 minutes, 30 minutes, 1 hour, etc.). In other embodiments, EPS 112 may be integral to sponsor bank 116, and EPS 112 may transfer funds from the payor debit account to the payee debit account.

In the example embodiment, EPS 112 is configured to transmit (F) a confirmation message to payee 104. The confirmation message may be, for example, a SMS message, an email, and/or a "push" notification via the app. In some embodiments, EPS 112 tracks which payors 108 have sent payment responses and may manage further confirmation and/or reminder messages about payment requests and/or payment responses.

Figure 2:
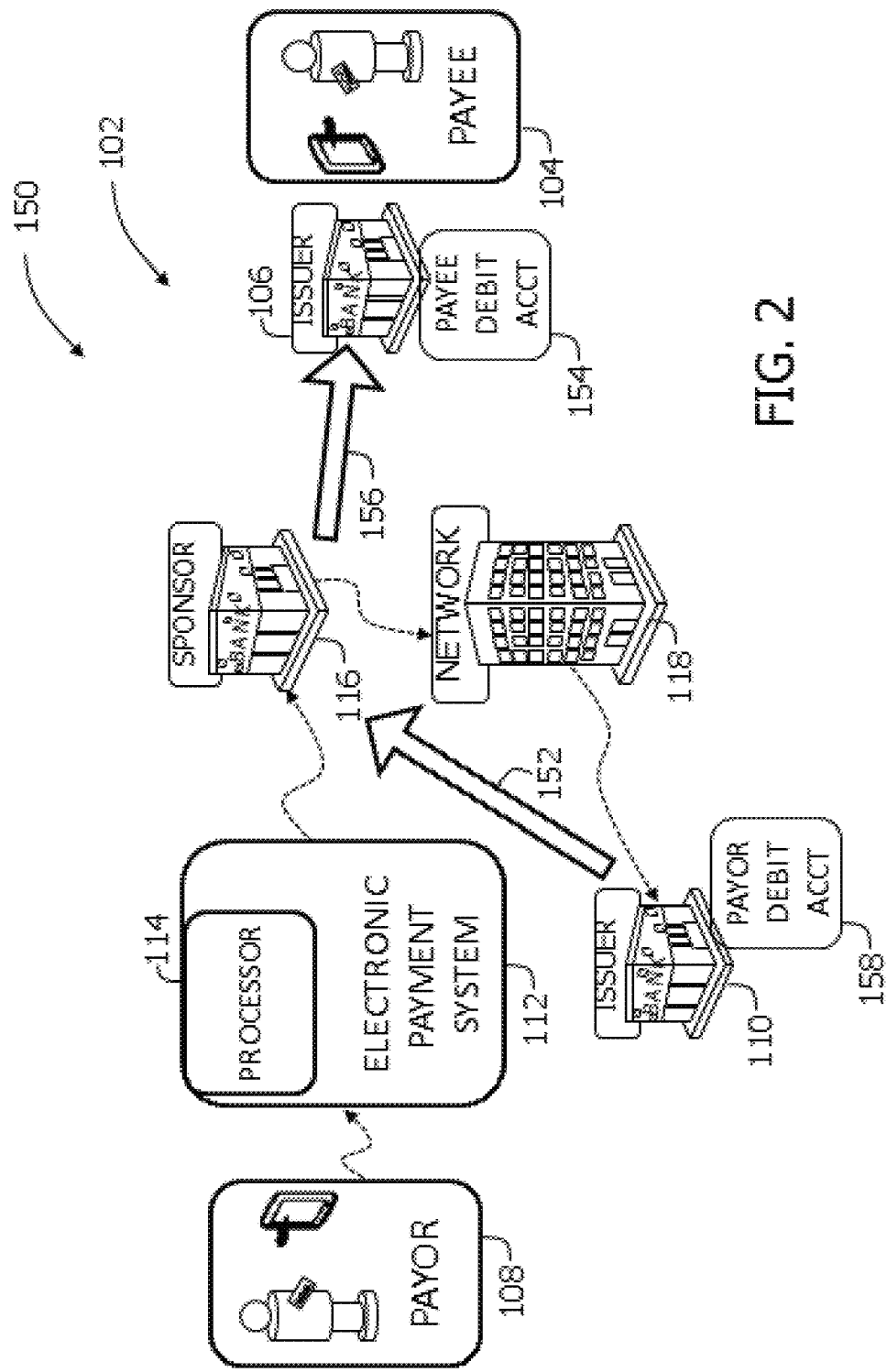

FIG. 2 is a schematic diagram 150 illustrating a flow of funds within multi-party financial processing system 102 for facilitating financial payments between parties shown in FIG. 1. More specifically, diagram 150 illustrates an example flow of funds between parties in processing system 102 during a payment request process.

As described above in reference to FIG. 1, payee 104 requests payment from (at least one) payor 108. EPS 112 receives a payment response from payor 108. The payment response includes at least a payment amount and an authorization to withdraw funds in the payment amount from the debit account 158 of payor 108. EPS 112 prompts a transfer of funds from the payor debit account 158 to the payee debit account 154 by transmitting the authorization contained in the payment response from payor 108 to sponsor bank 116. EPS 112 may also transmit a payee debit account 154 identifier and a payor debit account 158 identifier either directly (e.g., the debit account number, PAN, BIN) or in a tokenized format to sponsor bank 116. Sponsor bank 116 coordinates a funds transfer through payment processing network 118. More specifically, sponsor bank 116 withdraws 152 funds in the payment amount from the payor debit account 158 with issuing bank 110. Sponsor bank 116 further transfers 156 funds in the payment amount to the payee debit account 154 with issuing bank 106. In the example embodiment, sponsor bank 116 facilitates real-time processing and transfer of funds. In some embodiments, sponsor bank 116 immediately posts a charge to the payor debit account 158 and immediately posts a credit to the payee debit account 154, and a settlement process between issuing bank 110, sponsor bank 116, and issuing bank 106 occurs at another point in time (e.g., at the end of the day).

Figure 3:
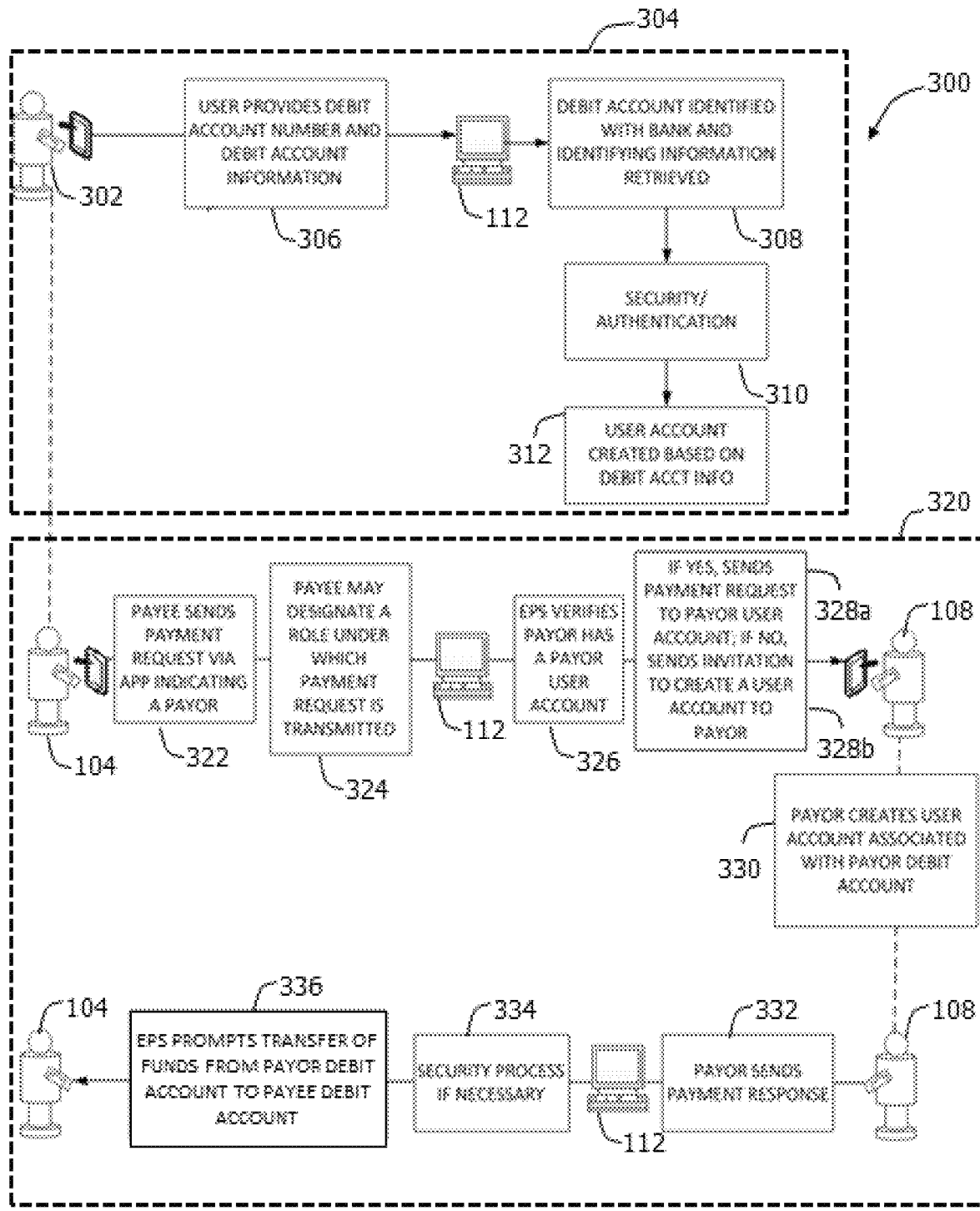

FIG. 3 is a flow diagram of a process 300 for managing financial payments between parties using financial processing system 102 (shown in FIG. 1). In the example embodiment, at least some steps of process 300 are performed using EPS 112 (as shown in FIG. 1). At least some other steps of process 300 are performed by payee 104 or payor 108 (both shown in FIG. 1). Any steps performed by payee 104 or payor 108 may be performed using a payee 124 or payor 128 computing device, respectively (both shown in FIG. 1), which may enable payee 104 or payor 108 to access a website, other web interface, or an app provided by processor 114 of EPS 112 (shown in FIG. 1). Although process 300 is shown to include only a single payor 108, any number of payors 108 may be present and included.

In the example embodiment, process 300 begins with a user 302 (which may be payee 104 and/or payor 108) creating 304 a user account associated with a debit account of user 302. User 302 provides 306 the user's debit account identifier (e.g., debit account number, PAN, BIN) and/or other debit account information to EPS 112. EPS 112 is configured to use the debit account identifier to identify 308 the user's debit account with the user's issuer bank (e.g., issuing bank 106 or 110, as shown in FIG. 1). EPS 112 may also be configured to retrieve any other identifying information associated with the debit account, including other debit accounts identifier(s) and/or personal identifier(s) of user 302 (e.g., address, phone number, etc.). In some embodiments, EPS 112 is configured to perform 310 any necessary security, authentication, and/or validation procedures. EPS 112 is further configured to create 312 a user account for user 302 associated with user's debit account.

In the example embodiment, user 302 proceeds to initiate a payment process 320 as payee 104. Payee 104 sends 322 a first payment request via payee computing device 124 (shown in FIG. 1) to EPS 112. The first payment request indicates one or more intended payors 108 using payor identifiers (e.g., phone number, email address, user account identifier). Payee 104 may further designate 324 a role under which payee 104 is transmitting the first payment request. The first payment request may further include a request identifier, which may include a virtual token, associating the first payment request with the payee user account of payee 104.

EPS 112 is configured to verify 326 whether payor 108 has a payor user account with EPS 112. If payor 108 does have a payor user account, EPS 112 is configured to send 328a a second payment request including a unique URL and a payee identifier to payor 108. If payor 108 does not have a payor user account, EPS 112 is configured to send 328b an invitation to payor 108 to create 302 a payor user account. If necessary, payor 108 creates 330 a payor user account associated with payor's debit account 158 (shown in FIG. 2). Using payor computing device 128 (shown in FIG. 1), payor 108 sends 332 a payment response to EPS 112. Sending 332 the payment response may include confirming and/or authorizing payment and determining a payment amount, if necessary. The payment response includes a response identifier and the request identifier. The response identifier associates the payment response with the payor user account and may include a virtual token. In some embodiments, EPS 112 is configured to perform 334 any necessary security, authentication, and validation procedures. EPS 112 is further configured to prompt 336 a funds transfer from payor's debit account 158 to payee's debit account 154 (shown in FIG. 2).

Figure 4:
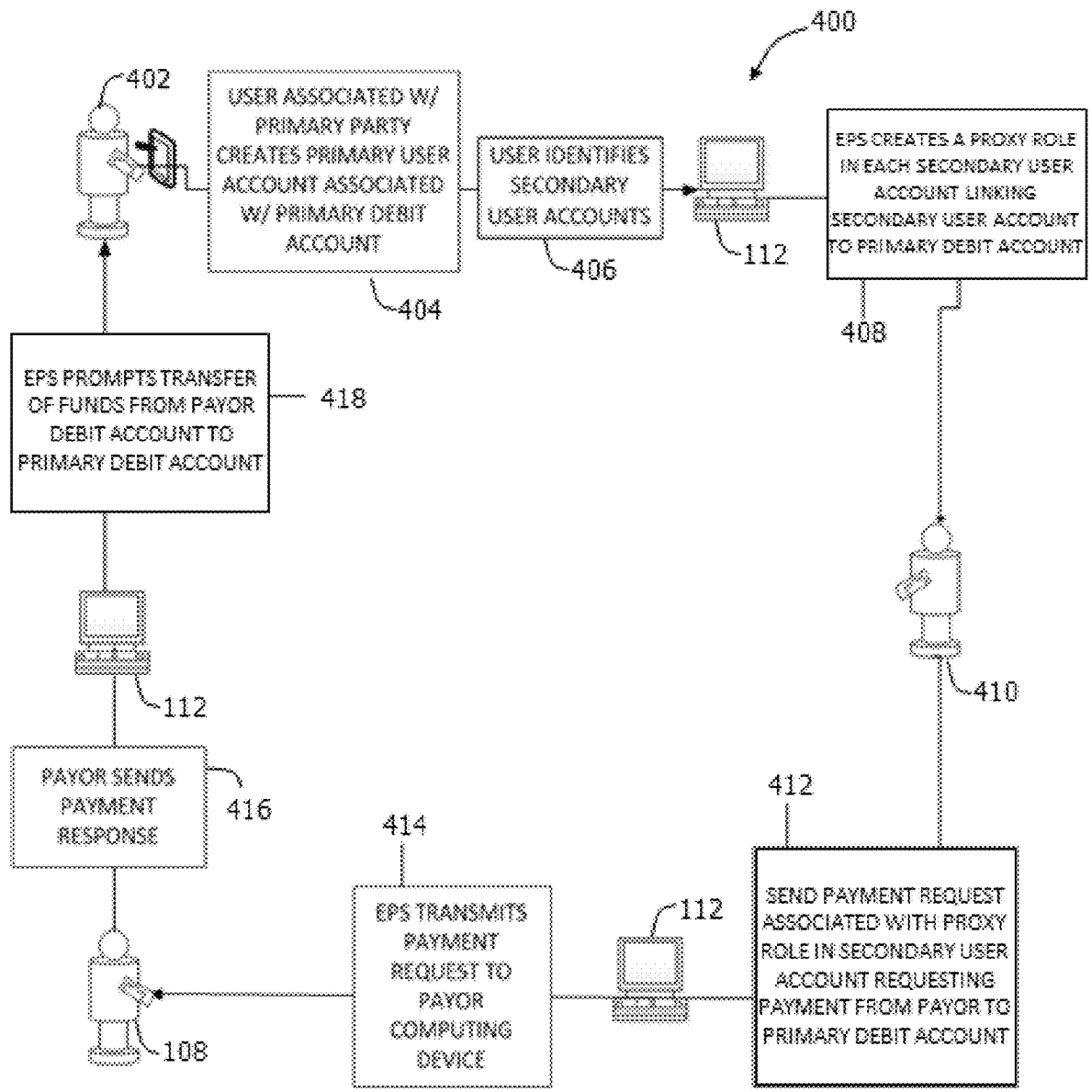

FIG. 4 is a flow diagram of a process 400 for managing financial payments between parties using financial processing system 102 (shown in FIG. 1). In the example embodiment, at least some steps of process 400 are performed using EPS 112 (as shown in FIG. 1). At least some other steps of process 400 may be performed by payee 104 or payor 108 (both shown in FIG. 1). Any steps performed by payee 104 or payor 108 may be performed using a payee 124 or payor 128 computing device, respectively (both shown in FIG. 1), which may enable payee 104 or payor 108 to access a website, other web interface, or an app provided by processor 114 of EPS 112 (shown in FIG. 1). Although process 400 is shown to include only a single payor 108, any number of payors 108 may be present and included.

In the example embodiment, a user 402 is associated with a primary party (not shown; e.g., charitable organization, school, etc.). User 402 creates 404 a primary user account associated with a primary debit account (following the process 504 described above in FIG. 5). User 402 further identifies 406 a plurality of secondary user accounts to which user 402 may grant authority to solicit funds on behalf of the primary party. EPS 112 is configured to create 408 a role in each secondary user account, wherein the role links the secondary user account to the primary debit account. A user 410 is associated with one of the plurality of secondary user accounts. User 410 sends 412 a first payment request, wherein the first payment request is associated with the user's role in the user account that associates the user account of user 410 with the primary debit account of the primary party. The first payment request is configured to request payment from at least one payor 108 to the primary debit account. EPS 112 is configured to transmit 414 a second payment request to payor computing device 128 (shown in FIG. 1). Payor 108 sends 416 a payment response to EPS 112. Sending 416 the payment response may include confirming payment and determining payment amount, if necessary. EPS 112 is further configured to prompt 418 a funds transfer from payor's debit account 158 (shown in FIG. 1) to the primary debit account.

FIGS. 5-12 depict an example embodiment of an app interface 502 of an app 500 for interacting with EPS 112 (shown in FIG. 1). More specifically, FIG. 5 depicts a welcome screen 504 of app 500, titled "EPS App" in the example embodiment. FIG. 6 depicts an account creation screen 602 of app 500. Account creation screen 602 includes a field for a user (e.g., payor 104 and/or payee 108) to enter the user's name 604, enter the user's email address 606, create a password 608, enter the user's debit account identifier 610 (e.g., debit card number), and enter a security code 612 for the debit account (e.g., a CVC or CVC2 code). In other embodiments, account creation screen 602 may include fields for the user to enter more information, such as a user's phone number, expiration date of a debit card associated with an entered debit card number, and/or a debit card billing zip code. Account creation screen 602 further includes a command 614 ("Sign Up," in the example embodiment) to complete the user account creation process.

FIG. 7 depicts an example introduction screen 702 indicating successful user account creation. Introduction screen 702 displays the user's name 704, the user's email 706, and a URL 708 generated by EPS 112 specific to the user's account. In the example embodiment, URL 708 is associated with a website or webpage that displays all of the user's active and public payment requests (e.g., public donation requests). In the example embodiment, introduction screen 702 also includes an option to create a new request 710 and an option to share the website 712 (e.g., to share URL 708).

FIG. 8 depicts an example contact screen 802 of app 500. In the example embodiment, contact screen 802 includes a menu of existing contacts of the user, which may be separated into groups 804 and/or may be separated by contact type 806 (e.g., social network contact, phone contact, email contact). Contact screen 802 also includes a search function 808, for the user to search for a specific contact. Contact screen 802 also includes a command to create 810 a new group of contacts.

Figure 9:
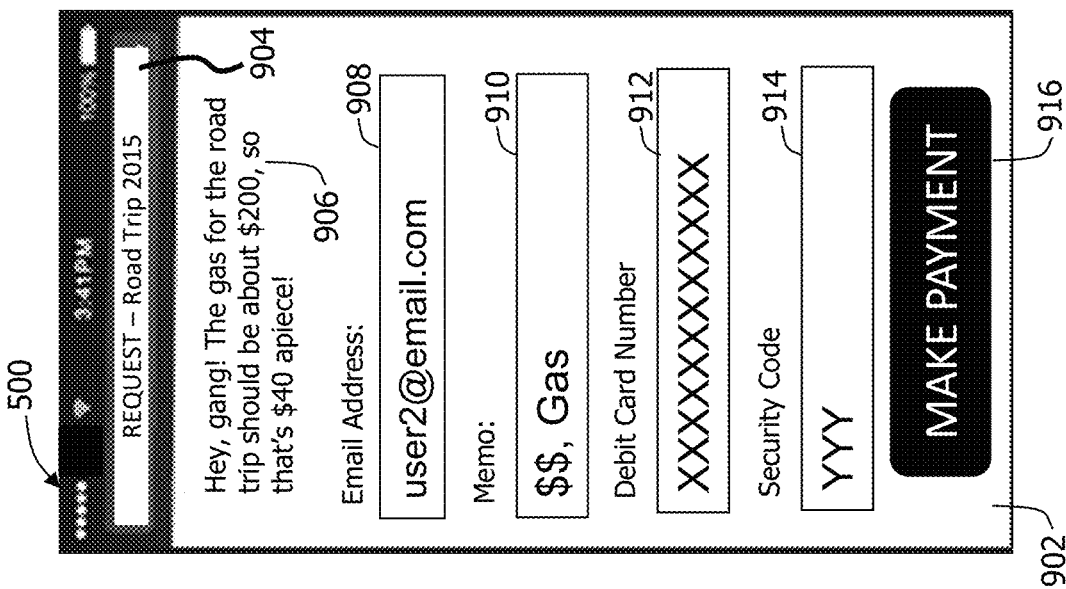

FIG. 9 depicts an example payment response screen 902 of app 500 in which a payor does not have a payor user account. In the example embodiment, payment response screen 902 includes a title 904 entered by the payee that is descriptive of the subject of the payment request. Payment response screen 902 also includes a brief description 906, also entered by the payee, which provides a more detailed description of the subject and nature of the payment request. In the example embodiment, the payor may not have a user account. Accordingly, the payor must enter his or her information, including payor email address 908, a memo 910 indicating the nature of the payment response, a payor debit account identifier 912, and a security code 914 associated with the payor debit account. In some embodiments, payment response screen 902 may also include fields for the payor to enter more information, including, for example, a phone number, an expiration date of a debit card associated with the payor debit account, and/or a payor debit card billing zip code. Payment response screen 902 further includes a command to make a payment 916.

Figure 10:
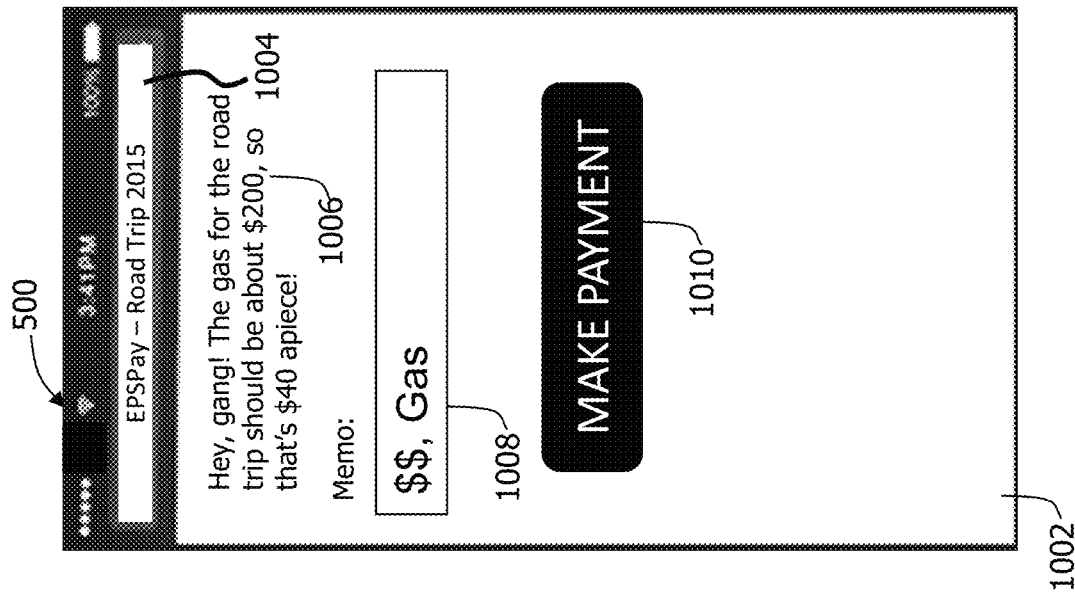

FIG. 10 depicts an example payment response screen 1002 of app 500 in which a payor does have a payor user account. Payment response screen 1002 includes a title 1004 and brief description 1006, substantially similar to those shown in FIG. 9. However, payment response screen 1002 may only include one field for entering an optional memo 1008, as all of the payor's debit account information and user account information is already stored and thus does not need to be re-entered to respond to a payment request. Payment response screen 1002 also includes a command to make a payment 1010.

FIG. 11 depicts an example sent requests screen 1102 of app 500. In the example embodiment, a payee has selected a "Mine" menu option 1104, which directs the payee to sent requests screen 1102. Sent requests screen 1102 displays all active payment requests 1106 made by the payee. Sent requests screen 1102 includes indicators for the name of the request 1108, the number of payment responses received 1110 from payors, and the amount of money collected 1112 from the payment responses.

FIG. 12 depicts an example request screen 1202 of app 500 for particular sent request 1106 (shown in FIG. 11). In the example embodiment, the payee has selected the Road Trip 2015 request 1106 from the sent requests screen 1102. Request screen 1202 shows a more detailed view of the responses received. In the example embodiment, request screen 1202 includes the payor user account 1204 and payor email address 1206 for each of the payors who have responded, as well as the amount of money 1208 transferred in each payment response.

Figure 13:
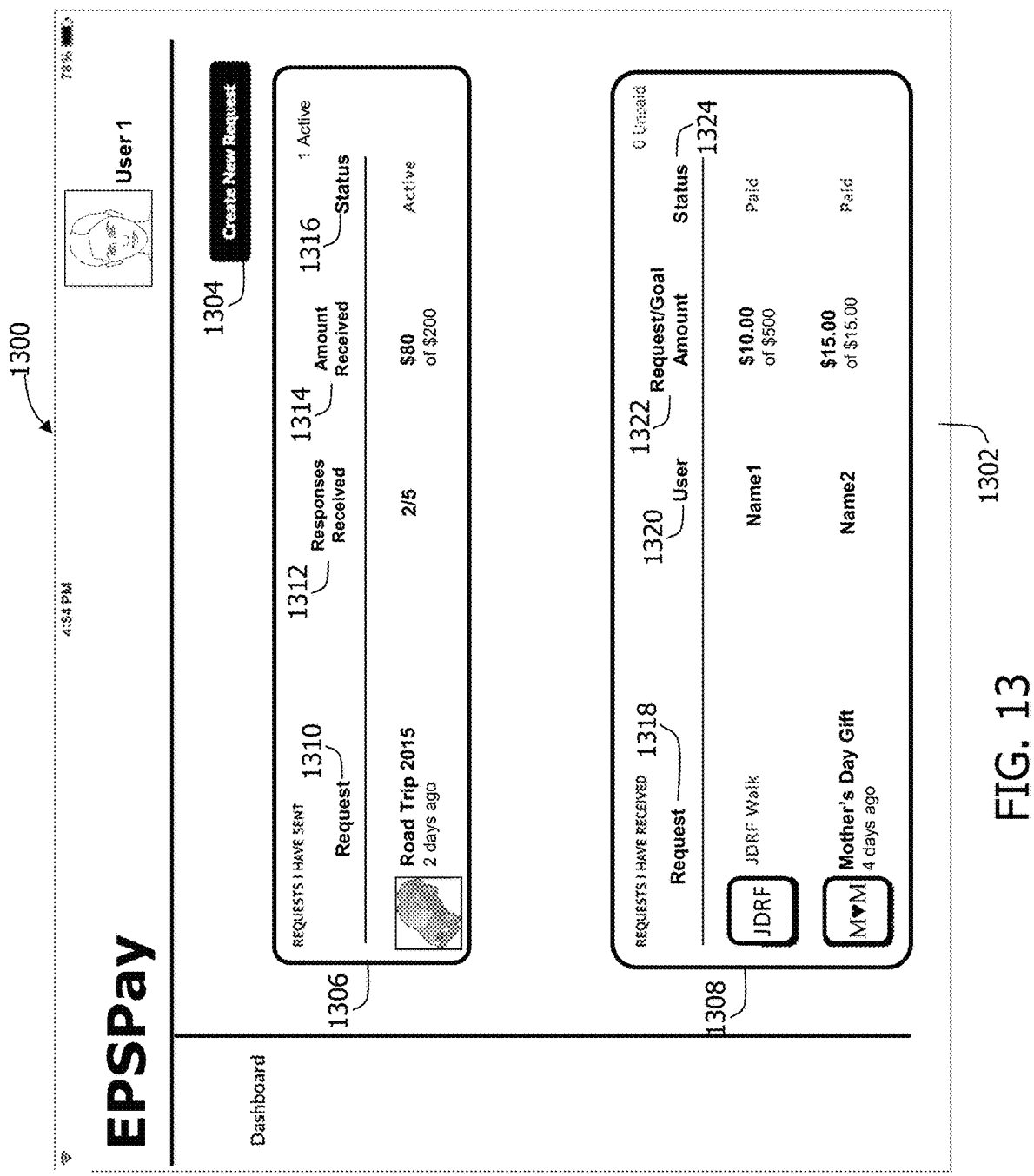

FIGS. 13-18 depict an example embodiment of a website interface 1300 for interacting with EPS 112 (shown in FIG. 1). More specifically, FIG. 13 depicts an example dashboard 1302 of website interface 1300 of a user ("User 1" in the example embodiment of FIG. 13). Dashboard 1302 includes an option to create a new request, as well as a status block for all active sent requests and a status block for all received requests. Dashboard 1302 is configured to track and manage both sent and received payment requests. In the example embodiment, the active requests are displayed with indicators of the name of the payment request, the last response time, the number of responses received out of a total number of payors to whom the request was sent, an amount of money collected, and a status indicator (e.g., active or inactive). The received requests are displayed with indicators of the name of the payment request, the payee user account, the amount transferred in the response, and the status (e.g., paid or unpaid).

Figure 14:
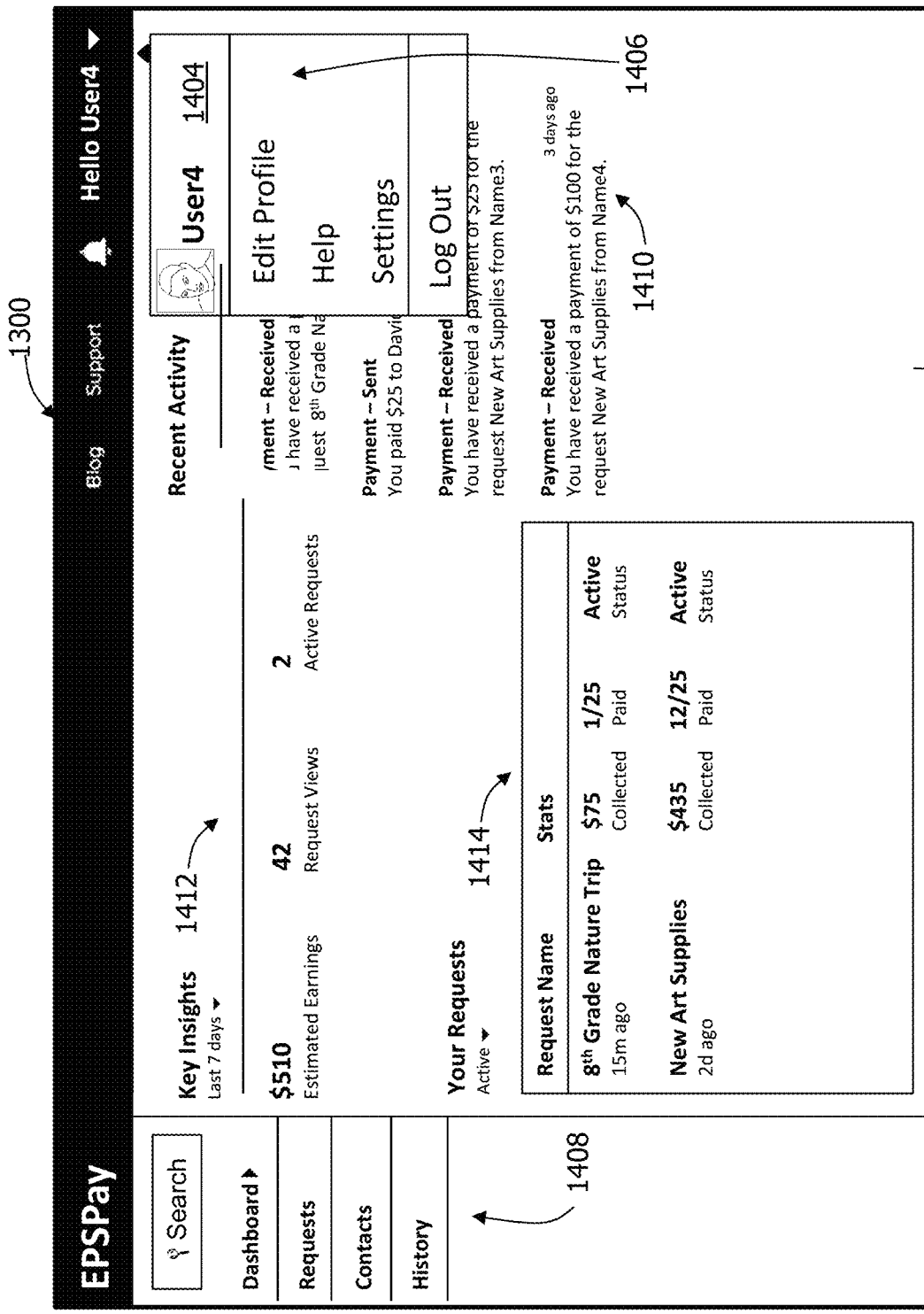

FIG. 14 depicts an alternate embodiment of a dashboard 1402 of website interface 1300. Dashboard 1402 is displayed for a user account 1404 of User 4, who is a teacher at East Middle School. In the example embodiment of FIG. 14 (as well as FIGS. 15-18), User 4 is using his user account 1404 to solicit funds on behalf of East Middle School (a primary party). Although not shown, an administrator associated with East Middle School has granted authority to User 4 to solicit funds on behalf of East Middle School. The administrator may have granted User 4 certain permissions, including how many payment requests he can make on behalf of the school over a certain time period (e.g., in a month, over the school year, in a quarter or semester, etc.); a maximum amount he can request in a single payment request; and to whom payment requests can be made (e.g., whether "public" payment requests are permissible, whether payment requests can be made to payors other than people associated with the students he teaches, etc.). Dashboard 1402 includes a profile menu 1406, which is shown to offer menu options such as "Edit Profile," "Help," "Settings," and "Log Out." Dashboard 1402 further includes a navigation menu 1408, enabling the user to navigate between pages of interest. In the example embodiment, navigation menu includes a link to pages such as Dashboard, Requests, Contacts, and History, as well as a search option.

Dashboard 1402 is configured to efficiently track the status of multiple active payment requests that have been sent to multiple payors. Accordingly dashboard 1402 also includes an activity tracking widget 1410, a key insights widget 1412, and an active requests preview 1414. Activity tracking widget 1410 may be set up to display one or both of recent payment responses received and recent payments made (i.e., payment responses made from User 4 to another party). In the example embodiment, key insights widget 1412 is configured to display cumulative statistics for user account 1404, including estimated earnings, a number of request views, and a number of active payment requests being tracked and managed. Key insights widget 1412 may be configured to display cumulative statistics over any period of time (e.g., seven days, one month, one year, etc.). Active requests preview 1414 is configured to display a brief overview of the user's active payment requests. In the example embodiment, active requests preview 1414 displays a request name, amount collected, number of responses, and a status indicator for each active request. In other embodiments, active requests preview 1414 may be configured to display fewer or more elements for each active request.

Figure 15:
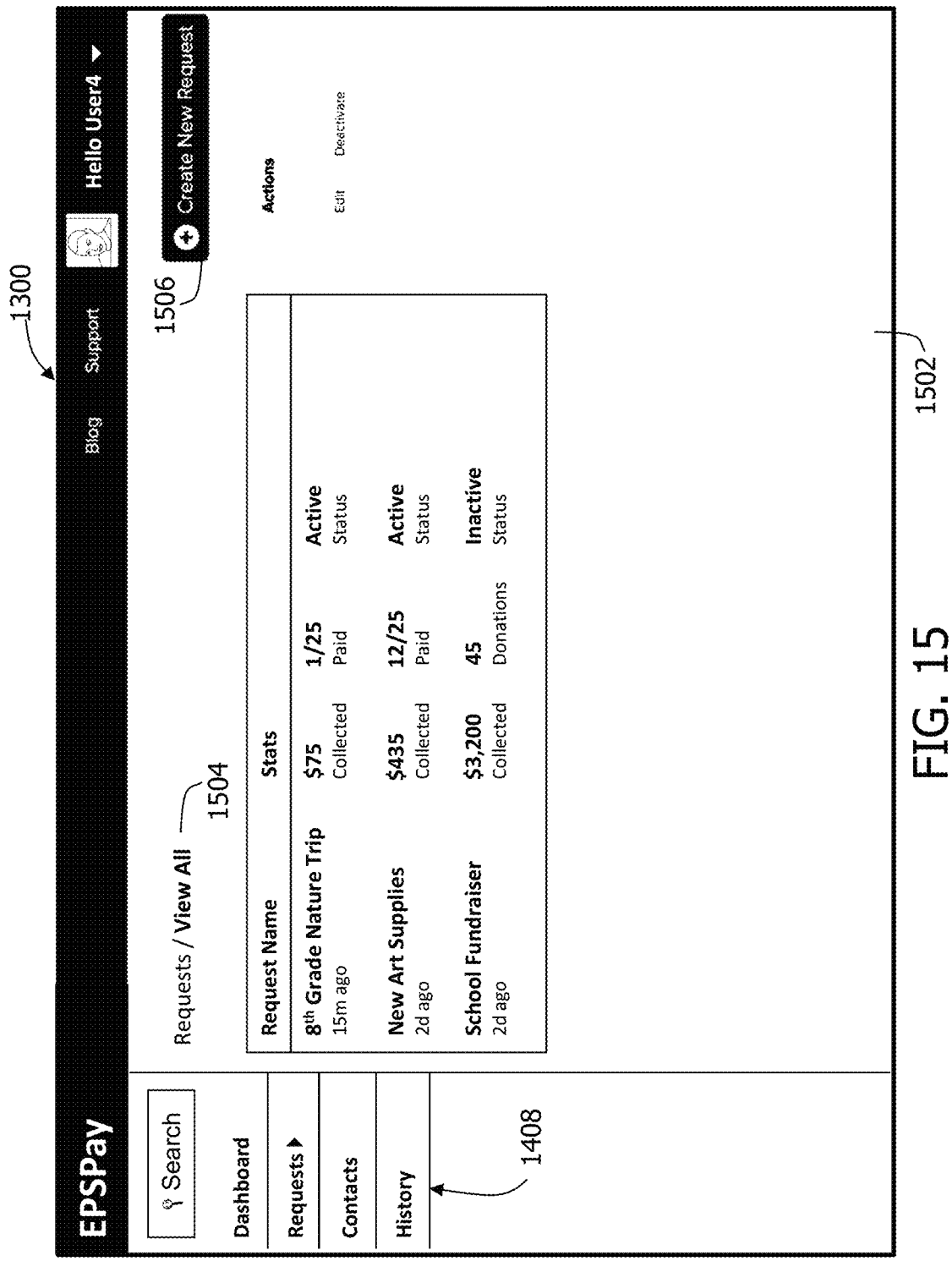

FIG. 15 depicts an example sent requests screen 1502 of website interface 1300. In the example embodiment, the user may navigate to sent requests screen 1502 using the Requests menu option of navigation menu 1408 (shown in FIG. 14). Sent requests screen 1502 is configured to display the details of each payment request sent by the user. In the example embodiment, the user has selected a "View All" option 1504, and accordingly, sent requests screen 1502 displays both active and inactive payment requests. The user may have the option to view only one of active and inactive payment requests. In the example embodiment, sent requests screen 1502 displays a request name, an amount collected, a number of responses received, a status indicator, and a time of last activity indicator for each payment request. In other embodiments, sent requests screen 1502 may be configured to display fewer or more elements for each payment request. Sent requests screen 1502 also includes a command to create a new request 1506.

FIG. 16 depicts an example create request screen 1602 of the website interface 1300. More particularly, create request screen 1602 depicts the creation of an "8$^{th}$ Grade Nature Trip" payment request, which was shown in FIGS. 14 and 15. In the example embodiment, the user (User 4) may select between a "contribution" option 1604, in which requests and/or responses may be sent with a variable payment amount, or a "Fixed" option 1606, in which requests are sent with a fixed amount, and payment responses may be sent with the fixed amount (or, in some embodiments, in a partial payment of the fixed amount, in more than one payment response). Create request screen 1602 includes a field for the payee to enter a name of the request 1608 and a description of the request 1610. Create request screen 1602 may include an option to include other content 1612 with the request, such as an image, an animation, a sound, etc. Create request screen 1602 also includes a generated unique URL field 1614 that may be pre-populated by EPS 112 after the title and/or description fields 1606, 1608 are completed by the user/payee. The unique URL 1614 includes a first portion 1614a associated with the payee user account and a second portion 1614b associated with the payment request (e.g., the subject, topic, or title of the payment request). In some embodiments, the user/payee may be able to edit the unique URL 1614. In other embodiments, the user/payee may not be able to edit the unique URL 1614. Create request screen 1602 further includes a privacy setting for the payment request, from which the user/payee may select "public" 1616 or "private" 1618. Public requests may be seen or shared by the public and may be shared over email, text, social media, or any other platform. Private payment requests are sent only to the payees selected by the user in an invitation field. In some embodiments, an invitation field 1620 may accept email addresses and/or phone numbers of invited payors. In some embodiments, create request screen 1602 may include an option for the user/payee to invite an entire group of payors 1622, wherein the groups are created by the user/payee before initiating the payment request. The user/payee may enter a request ending date in an ending date field 1624, or may choose to leave the ending date field 1624 blank (i.e., have no deadline for payment responses to be sent). In some embodiments, create request screen 1602 further includes a preview 1626 of the payment request that will be generated and sent to the invited/selected payors. The user/payee may create and send the payment request by selecting a "create request" option 1628. The user/payee may alternatively select one of a "delete" option 1630 and a "save as draft" option 1632.

FIG. 17 depicts an example payment page 1702 of website interface 1300. Payment page 1702 is associated with the unique URL 1614 generated upon creation of the payment request, and, more specifically, payment page 1702 is accessed using the unique URL 1614. Payment page 1702 includes a title 1704, description 1706, and user account 1708 (e.g., a payee user account or a secondary user account associated with a primary party) associated with the payment request. A payor may select a response option 1710 ("donate money," in the example embodiment) to initiate a payment response. In some embodiments, such as for private payment requests, EPS 112 may determine that a payor does not have a payor user account and may generate a unique URL that includes a third portion (not shown in FIG. 17) including a payor identification token. For example, EPS 112 may generate a unique URL such as https://zzzzz.com/user4/8th-grade-nature-trip/XXXXXX that will be sent to a particular payor that EPS 112 has determined does not have a payor user account, wherein "XXXXXX" is the third portion including the payor identification token, which allows EPS 112 to associate a payment response from the payor with the second payment request. The unique URL including the third portion may be associated with a payment page that looks and functions like payment page 1702.

FIG. 18 depicts a payment response screen 1802 of website interface 1300 in which the payor does not have a user account. As in FIG. 9 in reference to app 500, the payor must enter his or her debit account identifiers 1804, 1806, 1808 and payor contact information 1810. In the example embodiment, payment response screen 1802 also includes a field for a payment amount 1812. Payment response screen 1802 includes an option 1814 ("donate", in the example embodiment) for completing and sending the payment response to EPS 112.

Figure 19:
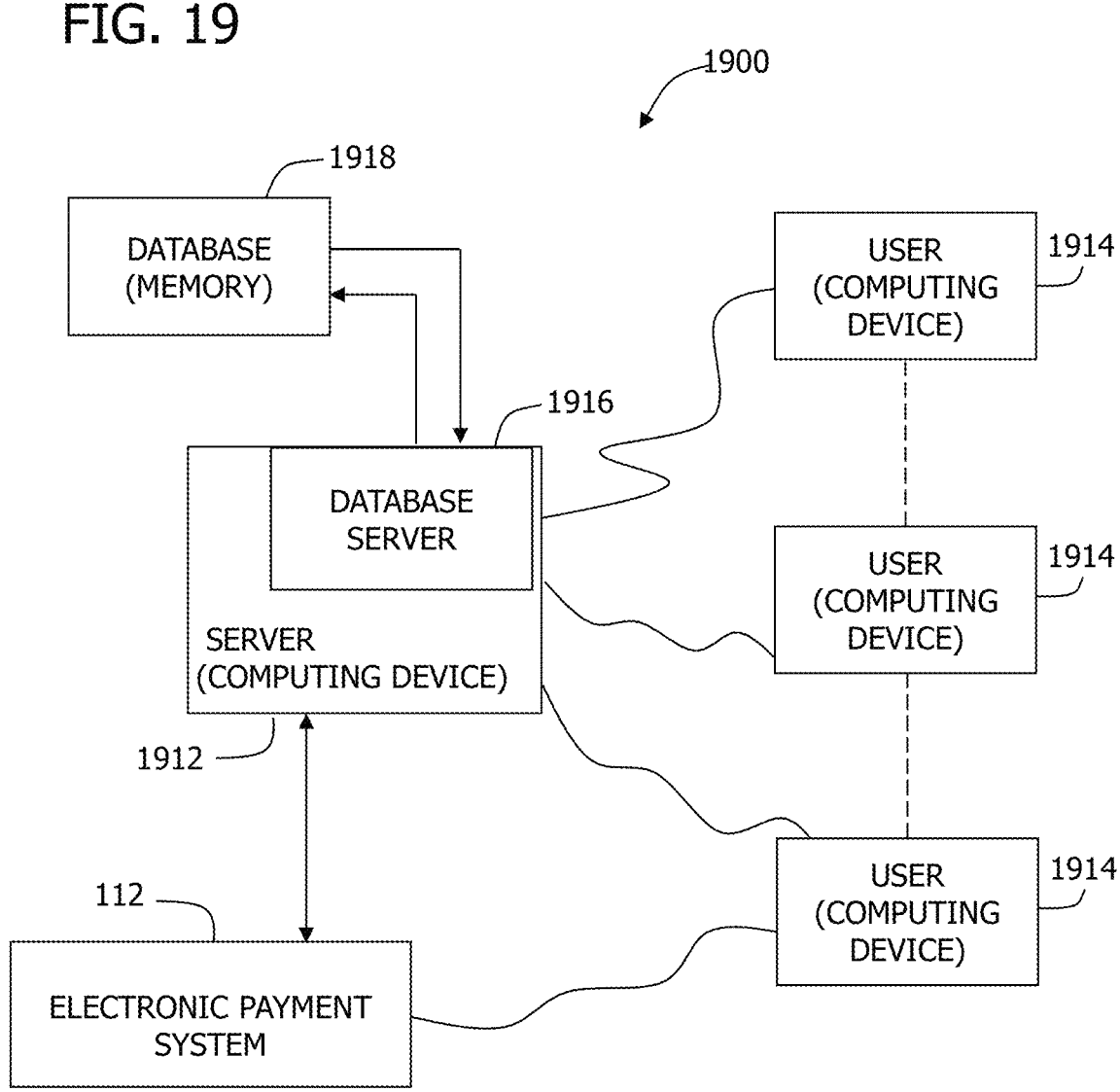

FIG. 19 is a simplified block diagram of an example system 1900 that may be used for facilitating financial payments between parties in accordance with one embodiment of the present disclosure. In the example embodiment, system 1900 includes EPS 112, as shown in FIG. 1. EPS 112 is configured to receive a debit account identifier for a user (e.g., payee 104 or payor 108, shown in FIG. 1), wherein the debit account identifier is associated with a debit account of the user. EPS 112 is also configured to create a user account using the debit account identifier, wherein the user account is linked to the debit account of the user. EPS 112 is further configured to receive a first payment request from a payee computing device 1914 (e.g., payee computing device 124, shown in FIG. 1) associated with a payee user account requesting payment from a payor to a payee debit account (e.g., payee debit account 154, shown in FIG. 1). EPS 112 is further configured to transmit a second payment request to a payor computing device 1914 (e.g., payor computing device 128, shown in FIG. 1) and to receive a payment response from the payor computing device 1914 authorizing payment from a payor debit account (e.g., payor debit account 158, shown in FIG. 1) to the payee debit account. EPS 112 is configured to prompt a transfer funds from the payor debit account to the payee debit account.

In the example embodiment, system 1900 includes a plurality of computer devices. More specifically, in the example embodiment, system 1900 includes EPS 112, which is communicatively coupled to a server system 1912. EPS 112 can access server system 1912 to store and access data, such as debit account identifiers, user (payee/payor) identifiers, account information, contact information, and other relevant data. EPS 112 may be integral to, associated with, or otherwise in communication with server system 1912. In some embodiments, EPS 112 may be associated with, or is part of, financial processing system 102 (as shown in FIG. 1). In other embodiments, EPS 112 may be associated with a third party. In some embodiments, EPS 112 may be associated with, be in communication with, or be part of, at least one of issuer bank 106, issuer bank 110, sponsor bank 116, and payment processing network 118 (all shown in FIG. 1).

In the example embodiment, user systems 1914 (also known as user computing devices) are computers that include a web browser or a software application, which enables user systems 1914 to access server system 1912 using the Internet. More specifically, user systems 1914 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User systems 1914 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 1916 is communicatively coupled to a database 1918 that stores data. In one embodiment, database 1918 includes at least one of debit account identifiers and user account identifiers. In the example embodiment, database 1918 is stored remotely from server system 1912. In some embodiments, database 1918 is decentralized.

In some embodiments, server system 1912 may be associated with payment processing network 118 and may be referred to as a payment processor computer system. Server system 1912 may be used for processing transaction data. In addition, at least one of user systems 1914 may include a computer system associated with at least one of issuer bank 106, issuer bank 108, and sponsor bank 116. Accordingly, server system 1912 and user systems 1914 may be utilized to process transaction data relating to transactions made by payor 108 utilizing a payment device processed by payment processing network 118 and issued by issuer bank 106. At least one user system 1914 may be associated with a user seeking to register, access information, or process a transaction with at least one of EPS 112, payment processing network 118, issuer bank 106, issuer bank 110, and sponsor bank 116. Moreover, at least one user system 1914 may be associated with at least of a payee 104 and a payor 108 (shown in FIG. 1) and may be used to access and/or interact with EPS 112.

Figure 20:
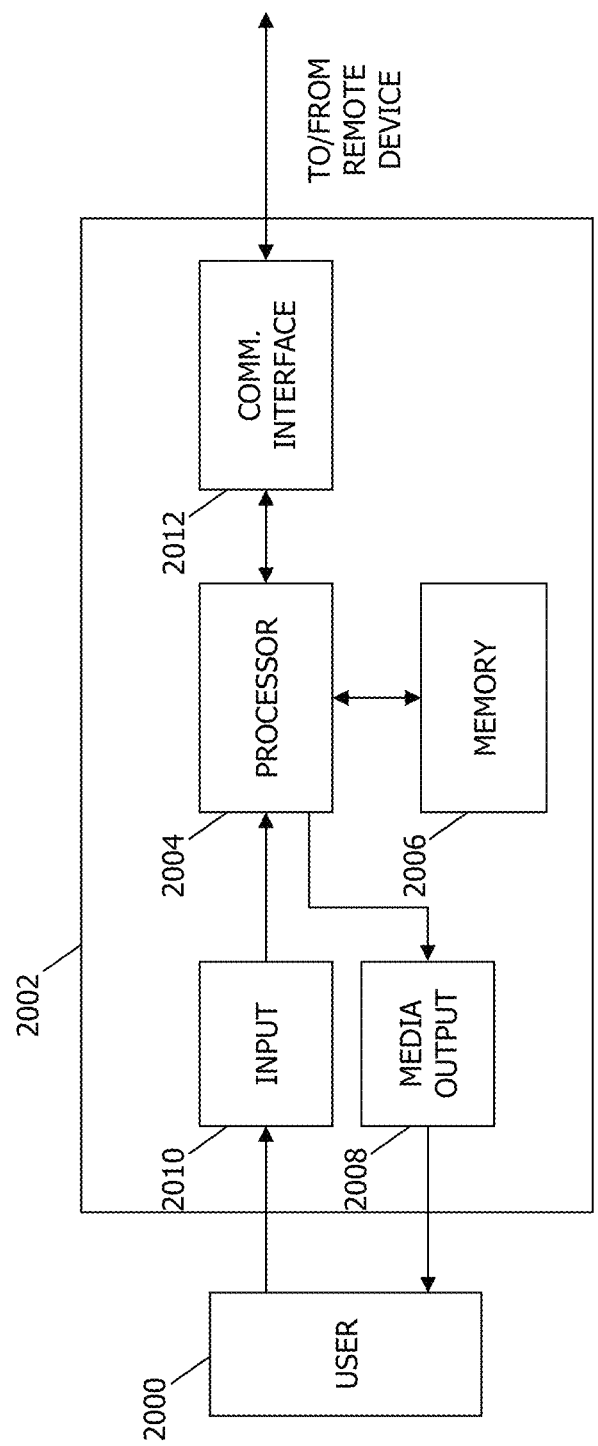

FIG. 20 illustrates an example configuration of a user device 1914 (shown in FIG. 19) in accordance with one embodiment of the present disclosure. User computer device 2002 is operated by a user 2000 (e.g., payee 104 or payor 108). User computer device 2002 may include, but is not limited to, user systems 1914 and EPS 112 (shown in FIG. 1). User computer device 2002 includes a processor 2004 for executing instructions. In some embodiments, executable instructions are stored in a memory area 2006. Processor 2004 may include one or more processing units (e.g., in a multi-core configuration). Memory area 2006 is any device allowing information such as executable instructions and/or transaction data to be stored and retrieved. Memory area 2006 may include one or more computer-readable media. Processor 2004 executes computer-executable instructions for implementing aspects of the disclosure. In some embodiments, processor 2004 is transformed into a special-purpose microprocessor by executing computer-executable instructions or by otherwise being programmed. For example, processor 2004 is programmed with instructions such as are illustrated in FIGS. 5 and 6.

User computer device 2002 also includes at least one media output component 2008 for presenting information to user 2000. Media output component 2008 is any component capable of conveying information to user 2000. In some embodiments, media output component 308 includes an output adapter (not shown) such as a video adapter and/or an audio adapter. The output adapter is operatively coupled to processor 2004 and operatively couplable to an output device such as a display device (e.g., a liquid crystal display (LCD), organic light emitting diode (OLED) display, or "electronic ink" display) or an audio output device (e.g., a speaker or headphones). In some embodiments, media output component 2008 is configured to present a graphical user interface (e.g., a web browser and/or an app) to user 2000. A graphical user interface may include, for example, an online store interface for viewing and/or purchasing items, and/or an application for managing payment information.

In some embodiments, user computer device 2002 includes an input device 2010 for receiving input from user 2000. User 2000 may use input device 2010 to, without limitation, select and/or enter one or more items to purchase and/or a purchase request, or to access credential information and/or payment information. Input device 2010 may include, for example, a keyboard, a pointing device, a mouse, a stylus, a touch-sensitive panel (e.g., a touch pad or a touch screen), a gyroscope, an accelerometer, a position detector, and/or an audio input device. A single component such as a touch screen may function as both an output device of media output component 2008 and input device 2010.

User computer device 2000 may also include a communication interface 2012, which is communicatively couplable to a remote device such as server system 1912 (shown in FIG. 19). Communication interface 2012 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 2006 are, for example, computer-readable instructions for providing a user interface to user 2000 via media output component 2008 and, optionally, receiving and processing input from input device 2010. A user interface may include, among other possibilities, a web browser and/or app. Web browsers enable users, such as user 2000, to display and interact with media and other information typically embedded on a web page or a website from server system 1912. An app allows user 2000 to interact with, for example, server system 1912. For example, instructions may be stored by a cloud service, and the output of the execution of the instructions sent to media output component 2008.

Figure 21:
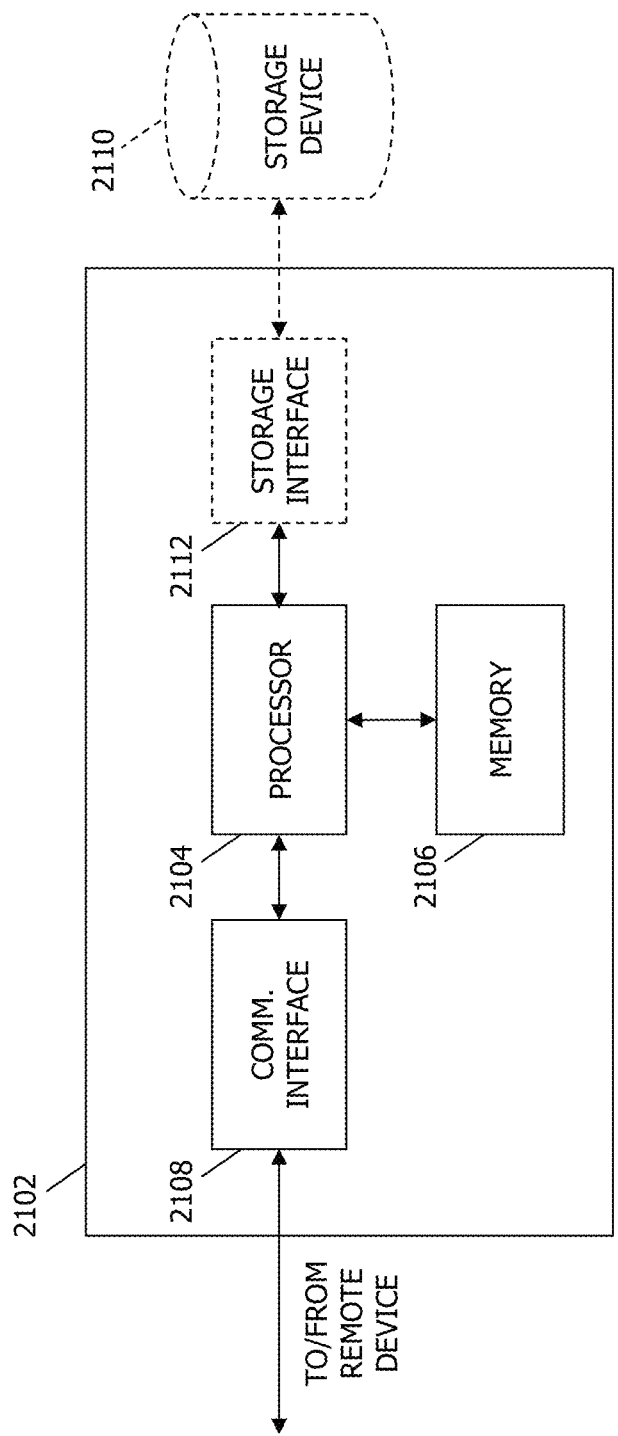

FIG. 21 illustrates an example configuration of a server system 1912 (shown in FIG. 19), in accordance with one embodiment of the present disclosure. Server computer device 2102 may include, but is not limited to, EPS 112 (shown in FIG. 1), server system 1912, and database server 1916 (both shown in FIG. 19). Server computer device 2102 includes a processor 2104 for executing instructions. Instructions may be stored in a memory area 2106. Processor 2104 may include one or more processing units (e.g., in a multi-core configuration).

Processor 2104 is operatively coupled to a communication interface 2108 such that server computing device 2102 is capable of communicating with a remote device such as another server computer device 2102, user systems 1914 (shown in FIG. 19), or EPS 112. For example, communication interface 2108 may receive requests from user systems 1914.

Processor 2104 may also be operatively coupled to a storage device 2110. Storage device 2110 is any computer-operated hardware suitable for storing and/or retrieving data, such as, but not limited to, data associated with database 1918 (shown in FIG. 19). In some embodiments, storage device 2110 is integrated in server computing device 2102. For example, server computing device 2102 may include one or more hard disk drives as storage device 2110. In other embodiments, storage device 2110 is external to server computing device 2102 and may be accessed by a plurality of server computing devices 2102. For example, storage device 2110 may include a storage area network (SAN), a network-attached storage (NAS) system, and/or multiple storage units such as hard disks and/or solid-state disks in a redundant array of inexpensive disks (RAID) configuration.

In some embodiments, processor 2104 is operatively coupled to storage device 2110 via a storage interface 2112. Storage interface 2112 is any component capable of providing processor 2104 with access to storage device 2110. Storage interface 2112 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 2104 with access to storage device 2110.

Figure 22:
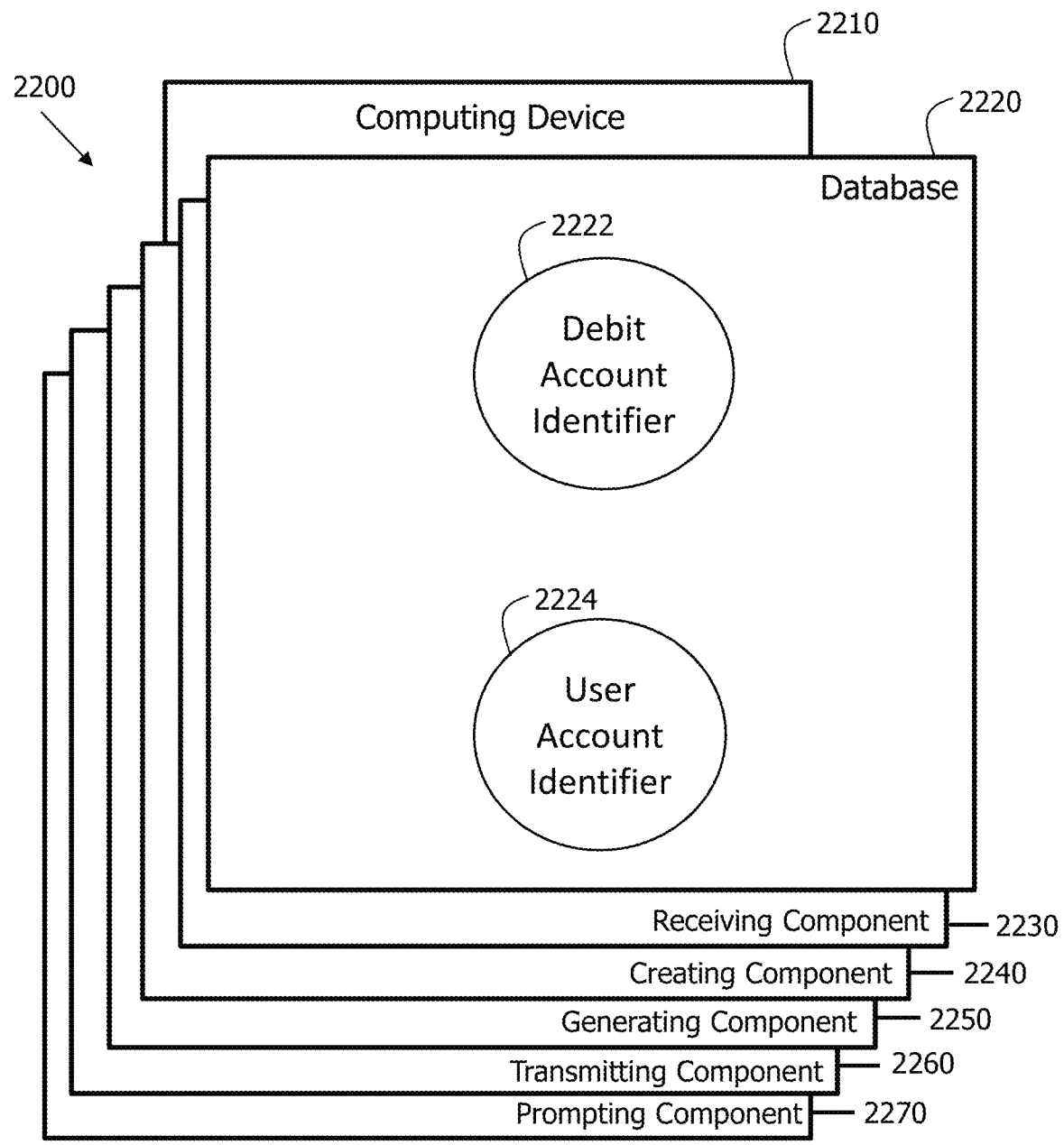

FIG. 22 is a diagram 2200 of components of a computer device 2210 that may be used in the system shown in FIG. 19. In some embodiments, computing device 2210 is similar to server system 1912; computing device 2210 may also be similar to EPS 112 (both shown in FIG. 19). A database 2220 may be coupled with several separate components within computing device 2210, which perform specific tasks. In this embodiment, database 2220 includes debit account identifiers 2222 and user account (e.g., payor user account and payee user account) identifiers 2224. In some embodiments, database 2220 is similar to database 1918 (shown in FIG. 19).

In the example embodiment, computer device 2210 includes a receiving component 2230. Receiving component 2230 may be configured to receive a payee debit account identifier 2222 from a payee computing device, the payee debit account identifier 2222 associated with a payee debit account. Receiving component 2230 may be further configured to a first payment request from the payee computing device requesting payment from a payor to the payee debit account. Receiving component 2230 may also be configured to receive a payment response from a payor computing device authorizing payment from a payor debit account to a payee associated with the payee user account.

Computer device 2210 also includes a creating component 2240, which may be configured to create a payee user account using the payee debit account identifier 2222, wherein the payee user account is linked to the payee debit account. Computer device 2210 further includes a generating component 2250. Generating component 2250 may be configured to generate a unique link for accessing a payment page associated with the first payment request. The unique link, which may be a URL, includes at least a first portion associated with the payee user account and a second portion associated with a subject of the first payment request.

In the example embodiment, computer device 2210 also includes a transmitting component 2260, which may be configured to transmit the second payment request to a payor computing device, wherein the second payment request includes the unique link. Computer device 2210 also includes a prompting component 2270, which may configured to prompt a transfer of funds from the payor debit account to the payee debit account, in response to receiving the payment response.

Described herein are computer systems such as a spend analysis computing device and related computer systems. As described herein, all such computer systems include a processor and a memory. However, any processor in a computing device referred to herein may also refer to one or more processors, wherein the processor may be in one computing device or a plurality of computing devices acting in parallel. Additionally, any memory in a computing device referred to herein may also refer to one or more memories, wherein the memories may be in one computing device or a plurality of computing devices acting in parallel.

As used herein, a processor may include any programmable system including systems using microcontrollers, reduced-instruction set circuits (RISC), application-specific integrated circuits (ASICs), logic circuits, and any other circuit or processor capable of executing the functions described herein. The above examples are example only and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term "database." Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom).

The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

The systems and processes are not limited to the specific embodiments described herein. In addition, components of each system and each process can be practiced independently and separate from other components and processes described herein. Each component and process also can be used in combination with other assembly packages and processes.

As used herein, the term "non-transitory computer-readable media" is intended to be representative of any tangible, computer-based device implemented in any method or technology for short-term and long-term storage of information, such as computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the disclosure, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for managing financial payments between parties using an electronic payment (EP) computing device in communication with a memory and the Internet, the method comprising:

receiving, over the Internet by the EP computing device, a payee debit account identifier from a payee computing device located remotely from the EP computing device, the payee debit account identifier associated with a payee debit account;

creating, by the EP computing device, a payee user account using the payee debit account identifier, wherein the payee user account is linked to the payee debit account;

receiving a first payment request from the payee computing device requesting payment from a plurality of payors to the payee debit account;

generating, for each of the payors, a respective unique link for accessing a payment page associated with the first payment request, wherein the unique link comprises a uniform resource locator (URL) including at least a first portion identifying the payee user account, a second portion identifying a subject of the first payment request, and a third portion including a unique payment token identifier associated with the respective payor;

transmitting, by the EP computing device over the Internet, a plurality of second payment requests to a plurality of payor computing devices located remotely from the EP computing device, wherein each of the payor computing devices is associated with one of the payors, wherein each of the second payment requests includes the unique link associated with the respective payor;

receiving, at a payment page generated by the EP computing device in response to the unique link activated from each of the payor computing devices, a payment response authorizing payment from a respective payor debit account to the payee user account;

prompting a transfer of funds from the payor debit account to the payee debit account; and identifying, on a dashboard page generated by the EP computing device, payors that have transferred funds in response to the second payment requests based on the unique payment token identifier in the respective unique link used by each of the payors.

2. The method of claim 1, wherein each unique payment token identifier comprises at least one of a random set of numbers and a random set of letters generated by the EP computing device, and wherein activation of the URL on the interface of the payor computing device associates the payment response with the second payment request.

3. The method of claim 1, wherein the first payment request includes a request identifier securely associating the first payment request with the payee debit account, wherein the payment response includes a payment amount and a response identifier securely associating the payment response with the payor debit account, and wherein prompting the transfer of funds further comprises:

identifying the payee debit account associated with the first payment request using a lookup table; and identifying the payor debit account associated with the payment response using the lookup table, such that funds can be transferred from the payor debit account to the payee debit account in the payment amount.

4. The method of claim 1, further comprising:

storing, by the EP computing device, in the memory a pre-selected period of time for transmitting a reminder message;

tracking an amount of time elapsed after the transmitting of the second payment request; and automatically transmitting the reminder message to the payor computing device in the event that the pre-selected period of time expires without receiving the payment response from the payor computing device.

5. The method of claim 1, wherein the payee user account is a secondary user account associated with a primary party, and wherein the payee debit account is a primary debit account associated with the primary party, the method further comprising:

receiving, by the EP computing device, an authorization message from an administrator associated with the primary party, the authorization message authorizing the payee user account to transmit payment requests on behalf of the primary party;

receiving at least one permission from the administrator, the at least one permission associated with the payee user account, wherein the at least one permission is configured to impose a control on the payee user account;

storing the at least one permission in the memory; and imposing the control of the at least one permission on the payee user account.

6. The method of claim 5, wherein the first payment request includes a payor identifier, and wherein the at least one permission includes at least one of: (i) a first control limiting a number of payment requests transmitted by the payee user account; (ii) a second control limiting a maximum request amount included in any payment request transmitted by the payee user account; (iii) and a third control over the payor identifiers included in any first payment request transmitted by the payee user account.

7. The method of claim 5 further comprising:

receiving, by the EP computing device, a primary debit account identifier from an administrator user computing device, the primary debit account identifier associated with the primary debit account;

creating, by the EP computing device, a primary user account using the primary debit account identifier, wherein the primary user account is linked to the primary debit account, and wherein the administrator has authority over the primary user account;

prompting the administrator to input a plurality of existing secondary user accounts, each of the plurality of secondary user accounts associated with a user associated with the primary party, wherein the plurality of secondary user accounts includes the payee user account;

creating, by the EP computing device, a proxy role in each of the plurality of secondary user accounts that links each of the plurality of secondary user accounts with the primary debit account;

receiving, by the EP computing device, the first payment request associated with the proxy role in the payee user account, requesting payment from the payor to the primary debit account;

transmitting the second payment request to the payor user computing device;

receiving the payment response from the payor user computing device authorizing payment from the payor debit account to the primary party; and prompting a transfer of funds from the payor debit account to the primary debit account.

8. The method of claim 1, wherein the first payment request includes a plurality of payor identifiers, the method further comprising:

transmitting, by the EP computing device, the second payment request to the plurality of payor computing devices associated with the plurality of payor identifiers.

9. The method of claim 1 further comprising:
receiving a plurality of first payment requests from the payee computing device;
transmitting, by the EP computing device, a plurality of sets of second payment requests to the plurality of payor computing devices, wherein each of the plurality of sets of second payment requests is associated with a corresponding one of the plurality of first payment requests; and
tracking, by the EP computing device, a plurality of sets of payment responses, each of the sets of plurality of payment responses associated with a corresponding one of the plurality of first payment requests.

10. An electronic payment (EP) computing device used to manage financial payments between parties, said EP computing device comprising a processor communicatively coupled to a memory device and the Internet, said processor programmed to:
receive, over the Internet, a payee debit account identifier from a payee computing device located remotely from the EP computing device, the payee debit account identifier associated with a payee debit account;
create a payee user account using the payee debit account identifier, wherein the payee user account is linked to the payee debit account;
receive a first payment request from the payee computing device requesting payment from a plurality of payors to the payee debit account;
generate, for each of the payors, a respective unique link for accessing a payment page associated with the first payment request, wherein the unique link comprises a uniform resource locator (URL) including at least a first portion identifying the payee user account, a second portion identifying a subject of the first payment request, and a third portion including a unique payment token identifier associated with the respective payor;
transmit, over the Internet, a plurality of second payment requests to a plurality of payor computing devices located remotely from the EP computing device, wherein each of the payor computing devices is associated with one of the payors, wherein each of the second payment requests includes the unique link associated with the respective payor;
receive, at a payment page generated by the EP computing device in response to the unique link activated from each of the payor computing devices, a payment response authorizing payment from a respective payor debit account to a payee associated with the payee user account;
prompt a transfer of funds from the payor debit account to the payee debit account; and
identify, on a dashboard page generated by the EP computing device, payors that have transferred funds in response to the second payment requests based on the unique payment token identifier in the respective unique link used by each of the payors.

11. The EP computing device of claim 10, wherein said processor is further programmed to:
receive a payor debit account identifier from the payor computing device, the payor debit account identifier associated with the payor debit account; and
create a payor user account using the payor debit account identifier, wherein the payor user account is linked to the payor debit account.

12. The EP computing device of claim 10, wherein the payment response includes a payment amount, and wherein said processor is further programmed to validate that the payor debit account has funds sufficient to cover the payment amount.

13. The EP computing device of claim 10, wherein the first payment request includes a request identifier securely associating the first payment request with the payee debit account, wherein the payment response includes a payment amount and a response identifier securely associating the payment response with the payor debit account, and wherein said processor is further programmed to:
identify the payee debit account associated with the first payment request using a lookup table; and
identify the payor debit account associated with the payment response using the lookup table, such that funds can be transferred from the payor debit account to the payee debit account in the payment amount.

14. The EP computing device of claim 10, wherein said processor is further programmed to:
store, in the memory device, a pre-selected period of time for transmitting a reminder message;
track an amount of time elapsed after the transmitting of the second payment request; and
automatically transmit the reminder message to the payor computing device in the event that the pre-selected period of time expires without receiving the payment response from the payor computing device.

15. The EP computing device of claim 10, wherein the payee user account is a secondary user account associated with a primary party, and wherein the payee debit account is a primary debit account associated with the primary party, and wherein said processor is further programmed to:
receive an authorization message from an administrator associated with the primary party, the authorization message authorizing the payee user account to transmit payment requests on behalf of the primary party;
receive at least one permission from the administrator, the at least one permission associated with the payee user account, wherein the at least one permission is configured to impose a control on the payee user account;
store the at least one permission in the memory device; and
impose the control of the at least one permission on the payee user account.

16. The EP computing device of claim 15, wherein the first payment request includes a payor identifier, and wherein the at least one permission includes at least one of: (i) a first control limiting a number of payment requests transmitted by the payee user account; (ii) a second control limiting a maximum request amount included in any payment request transmitted by the payee user account; (iii) and a third control over the payor identifiers included in any first payment request transmitted by the payee user account.

17. The EP computing device of claim 15, wherein said processor is further programmed to:
receive a primary debit account identifier from an administrator user computing device, the primary debit account identifier associated with the primary debit account;
create a primary user account using the primary debit account identifier, wherein the primary user account is linked to the primary debit account, and wherein the administrator has authority over the primary user account;

prompt the administrator to input a plurality of existing secondary user accounts, each of the plurality of secondary user accounts associated with a user associated with the primary party, wherein the plurality of secondary user accounts includes the payee user account;

create a proxy role in each of the plurality of secondary user accounts that links each of the plurality of secondary user accounts with the primary debit account;

receive the first payment request associated with the proxy role in the payee user account, requesting payment from the payor to the primary debit account;

transmit the second payment request to the payor user computing device;

receive the payment response from the payor user computing device authorizing payment from the payor debit account to the primary party; and prompt a transfer of funds from the payor debit account to the primary debit account.

18. The EP computing device of claim 10, wherein the first payment request includes a plurality of payor identifiers, and wherein said processor is further programmed to:

transmit the second payment request to the plurality of payor computing devices associated with the plurality of payor identifiers.

19. The EP computing device of claim 10, wherein said processor is further programmed to:

receive a plurality of sets of first payment requests from the payee computing device;

transmit a plurality of sets of second payment requests to the plurality of payor computing devices, wherein each of the plurality of sets of second payment requests is associated with a corresponding one of the plurality of first payment requests; and track a plurality of sets of payment responses, each of the plurality of sets of payment responses associated with a corresponding one of the plurality of first payment requests.

20. At least one non-transitory computer-readable storage media having computer-executable instructions embodied thereon, wherein when executed by an electronic payment computing device having at least one processor coupled to at least one memory device, the computer-executable instructions cause the at least one processor to:

receive, over the Internet, a payee debit account identifier from a payee computing device located remotely from the EP computing device, the payee debit account identifier associated with a payee debit account;

create a payee user account using the payee debit account identifier, wherein the payee user account is linked to the payee debit account;

receive a first payment request from the payee computing device requesting payment from a plurality of payors to the payee debit account;

generate, for each of the payors, a respective unique link for accessing a payment page associated with the first payment request, wherein the unique link comprises a uniform resource locator (URL) including at least a first portion identifying the payee user account, a second portion identifying a subject of the first payment request, and a third portion including a unique payment token identifier associated with the respective payor;

transmit, over the Internet, a plurality of second payment requests to a plurality of payor computing devices located remotely from the EP computing device, wherein each of the payor computing devices is associated with one of the payors, wherein each of the second payment requests includes the unique link associated with the respective payor;

receive, at a payment page generated by the at least one processor in response to the unique link activated from each of the payor computing devices, a payment response authorizing payment from a respective payor debit account to a payee associated with the payee user account;

prompt a transfer of funds from the payor debit account to the payee debit account; and identify, on a dashboard page generated by the at least one processor, payors that have transferred funds in response to the second payment requests based on the unique payment token identifier in the respective unique link used by each of the payors.

21. The computer-readable storage medium of claim 20, wherein the computer-executable instructions further cause the at least one processor to:

receive a payor debit account identifier from the payor computing device, the payor debit account identifier associated with the payor debit account; and create a payor user account using the payor debit account identifier, wherein the payor user account is linked to the payor debit account.

22. The computer-readable storage medium of claim 20, wherein the payment response includes a payment amount, and wherein the computer-executable instructions further cause the at least one processor to validate that the payor debit account has funds sufficient to cover the payment amount.

23. The computer-readable storage medium of claim 20, wherein the first payment request includes a request identifier securely associating the first payment request with the payee debit account, wherein the payment response includes a payment amount and a response identifier securely associating the payment response with the payor debit account, and wherein the computer-executable instructions further cause the at least one processor to:

identify the payee debit account associated with the first payment request using a lookup table; and identify the payor debit account associated with the payment response using the lookup table, such that funds can be transferred from the payor debit account to the payee debit account in the payment amount.

24. The computer-readable storage medium of claim 20, wherein the computer-executable instructions further cause the at least one processor to:

store, in the at least one memory device, a pre-selected period of time for transmitting a reminder message;

track an amount of time elapsed after the transmitting of the second payment request; and automatically transmit the reminder message to the payor computing device in the event that the pre-selected period of time expires without receiving the payment response from the payor computing device.

25. The computer-readable storage medium of claim 20, wherein the payee user account is a secondary user account associated with a primary party, and wherein the payee debit account is a primary debit account associated with the primary party, and wherein the computer-executable instructions further cause the at least one processor to:

receive an authorization message from an administrator associated with the primary party, the authorization message authorizing the payee user account to transmit payment requests on behalf of the primary party;

receive at least one permission from the administrator, the at least one permission associated with the payee user account, wherein the at least one permission is configured to impose a control on the payee user account;

store the at least one permission in the at least one memory device; and impose the control of the at least one permission on the payee user account.

26. The computer-readable storage medium of claim 25, wherein the first payment request includes a payor identifier, and wherein the at least one permission includes at least one of: (i) a first control limiting a number of payment requests transmitted by the payee user account; (ii) a second control limiting a maximum request amount included in any payment request transmitted by the payee user account; (iii) and a third control over the payor identifiers included in any first payment request transmitted by the payee user account.

27. The computer-readable storage medium of claim 25, wherein the computer-executable instructions further cause the at least one processor to:

receive a primary debit account identifier from an administrator user computing device, the primary debit account identifier associated with the primary debit account;

create a primary user account using the primary debit account identifier, wherein the primary user account is linked to the primary debit account, and wherein the administrator has authority over the primary user account;

prompt the administrator to input a plurality of existing secondary user accounts, each of the plurality of secondary user accounts associated with a user associated with the primary party, wherein the plurality of secondary user accounts includes the payee user account;

create a proxy role in each of the plurality of secondary user accounts that links each of the plurality of secondary user accounts with the primary debit account;

receive the first payment request associated with the proxy role in the payee user account, requesting payment from the payor to the primary debit account;

transmit the second payment request to the payor user computing device;

receive the payment response from the payor user computing device authorizing payment from the payor debit account to the primary party; and prompt a transfer of funds from the payor debit account to the primary debit account.

28. The computer-readable storage medium of claim 20, wherein the computer-executable instructions further cause the at least one processor to:

receive a plurality of first payment requests from the payee computing device;

transmit a plurality of sets of second payment requests to the plurality of payor computing devices, wherein each of the plurality of sets of second payment requests is associated with a corresponding one of the plurality of first payment requests; and track a plurality of sets of payment responses, each of the plurality of sets of payment responses associated with a corresponding one of the plurality of first payment requests.

* * * * *